(12) United States Patent
Chen-Ho et al.

(10) Patent No.: US 9,289,962 B2
(45) Date of Patent: Mar. 22, 2016

(54) LASER-PERSONALIZABLE SECURITY ARTICLES

(75) Inventors: Kui Chen-Ho, Woodbury, MN (US); Christopher K. Haas, St. Paul, MN (US); Douglas S. Dunn, Maplewood, MN (US); Duane D. Fansler, Dresser, WI (US); Jianhui Xia, Woodbury, MN (US); Dong-Wei Zhu, Shoreview, MN (US); Timothy D. Filiatrault, Maplewood, MN (US); Barbara J. Filiatrault, legal representative, Maplewood, MN (US); David B. Olson, Marin on St. Croix, MN (US); Randy A. Larson, River Falls, WI (US); Jun-Ying Zhang, Perrysburg, OH (US); Encai Hao, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 73 days.

(21) Appl. No.: 14/118,592

(22) PCT Filed: May 16, 2012

(86) PCT No.: PCT/US2012/038026
§ 371 (c)(1),
(2), (4) Date: Feb. 21, 2014

(87) PCT Pub. No.: WO2012/162041
PCT Pub. Date: Nov. 29, 2012

(65) Prior Publication Data
US 2015/0140292 A1    May 21, 2015

Related U.S. Application Data

(60) Provisional application No. 61/488,205, filed on May 20, 2011.

(51) Int. Cl.
*B32B 3/00* (2006.01)
*B32B 3/10* (2006.01)
(Continued)

(52) U.S. Cl.
CPC ... *B32B 3/10* (2013.01); *B32B 7/12* (2013.01); *B32B 37/18* (2013.01); *B42D 25/29* (2014.10);
(Continued)

(58) Field of Classification Search
None
See application file for complete search history.

(56) References Cited

U.S. PATENT DOCUMENTS

RE24,906 E    12/1960    Ulrich
3,154,872 A    11/1964    Nordgren
(Continued)

FOREIGN PATENT DOCUMENTS

DE    4441198    5/1996
EP    0372756    6/1990
(Continued)

OTHER PUBLICATIONS

Smith, "The Design of Optical systems", Modern Optical Engineering; pp. 104-105 (1966).
(Continued)

*Primary Examiner* — Mark Ruthkosky
*Assistant Examiner* — Laura C Powers
(74) *Attorney, Agent, or Firm* — Jeffrey M. Olofson

(57) ABSTRACT

Laser-personalizable security articles include a multi-layer security document and an optically transparent processing tape. The multi-layer security document includes an optically transparent cover layer, a composite image and an imagable layer adjacent to the cover layer. The first surface of the cover layer is at least partially a microstructured surface, where the microstructured surface forms microlenses or a lenticular surface. The composite image is made by a collection of complete or partial images viewed through the microstructured surface of the cover layer. The composite image is located on or within the second surface of the cover layer. The imagable layer is a laser. The optically transparent processing tape sufficiently wets out on the misconstructed surface to render the microstructured surface invisible to a writing laser.

7 Claims, 2 Drawing Sheets

(51) Int. Cl.
*B32B 7/12* (2006.01)
*B32B 37/18* (2006.01)
*B42D 25/29* (2014.01)
*B42D 25/342* (2014.01)
*B42D 25/324* (2014.01)
*B42D 25/41* (2014.01)
*B42D 25/47* (2014.01)

(52) U.S. Cl.
CPC ............ *B42D 25/41* (2014.10); *B32B 2255/26* (2013.01); *B32B 2307/412* (2013.01); *B32B 2554/00* (2013.01); *B42D 25/324* (2014.10); *B42D 25/47* (2014.10); *B42D 2033/04* (2013.01); *B42D 2033/24* (2013.01); *B42D 2033/30* (2013.01); *B42D 2035/20* (2013.01); *B42D 2035/36* (2013.01); *B42D 2035/50* (2013.01); *Y10T 156/10* (2015.01); *Y10T 428/24868* (2015.01)

(56) References Cited

U.S. PATENT DOCUMENTS

| | | |
|---|---|---|
| 3,250,808 A | 5/1966 | Moore |
| 3,801,183 A | 4/1974 | Sevelin |
| 4,082,426 A | 4/1978 | Brown |
| 4,099,838 A | 7/1978 | Cook |
| 4,121,011 A | 10/1978 | Glover |
| 4,200,875 A | 4/1980 | Galanos |
| 4,424,990 A | 1/1984 | White |
| 4,619,979 A | 10/1986 | Kotnour |
| 4,654,233 A | 3/1987 | Grant |
| 4,728,571 A | 3/1988 | Clemens |
| 4,743,526 A | 5/1988 | Ando |
| 4,833,179 A | 5/1989 | Young |
| 4,843,134 A | 6/1989 | Kotnour |
| 4,855,184 A | 8/1989 | Klun |
| 5,591,527 A | 1/1997 | Lu |
| 5,637,646 A | 6/1997 | Ellis |
| 5,648,407 A | 7/1997 | Goetz |
| 5,677,050 A | 10/1997 | Bilkadi |
| 5,712,731 A | 1/1998 | Drinkwater |
| 5,838,466 A | 11/1998 | Mallik |
| 5,877,895 A | 3/1999 | Shaw |
| 6,010,751 A | 1/2000 | Shaw |
| 6,224,949 B1 | 5/2001 | Wright |
| 6,264,747 B1 | 7/2001 | Shaw |
| 6,288,842 B1 | 9/2001 | Florczak |
| 6,299,799 B1 | 10/2001 | Craig |
| 6,339,111 B1 | 1/2002 | Moon |
| 6,376,590 B2 | 4/2002 | Kolb |
| 6,749,925 B2 | 6/2004 | Hoppe |
| 6,758,936 B1 | 7/2004 | Kiekhaefer |
| 7,241,437 B2 | 7/2007 | Davidson |
| 7,336,422 B2 | 2/2008 | Dunn |
| 7,385,020 B2 | 6/2008 | Anderson |
| 7,449,146 B2 | 11/2008 | Rakow |
| 2004/0077775 A1 | 4/2004 | Audenaert |
| 2005/0180020 A1* | 8/2005 | Steenblik ............ B44F 1/06 359/626 |
| 2005/0250921 A1 | 11/2005 | Qiu |
| 2007/0081254 A1 | 4/2007 | Endle |
| 2007/0178295 A1 | 8/2007 | Haas |
| 2008/0118862 A1 | 5/2008 | Dunn |
| 2008/0160185 A1 | 7/2008 | Endle |
| 2008/0212192 A1 | 9/2008 | Steenblik |
| 2008/0284157 A1 | 11/2008 | Muke |
| 2009/0003517 A1 | 1/2009 | Yoneyama |
| 2009/0035179 A1 | 2/2009 | Rakow |
| 2010/0103528 A1 | 4/2010 | Endle |
| 2010/0285398 A1 | 11/2010 | Hogerton |
| 2011/0063392 A1 | 3/2011 | Wu |
| 2011/0086221 A1 | 4/2011 | Pokorny |
| 2011/0179631 A1 | 7/2011 | Gates |

FOREIGN PATENT DOCUMENTS

| | | |
|---|---|---|
| EP | 1077426 | 2/2001 |
| JP | 07-090028 | 4/1995 |
| WO | WO 97-33945 | 9/1997 |
| WO | WO 03-061983 | 7/2003 |
| WO | WO 2006-102383 | 9/2006 |
| WO | WO 2006-137738 | 12/2006 |
| WO | WO 2007-047259 | 4/2007 |
| WO | WO 2009-140088 | 11/2009 |
| WO | WO 2010-075373 | 7/2010 |
| WO | WO 2010-115235 | 10/2010 |
| WO | WO 2012-003247 | 1/2012 |
| WO | WO 2012-012118 | 1/2012 |
| WO | WO 2012-162041 | 11/2012 |
| WO | WO 2012-162053 | 11/2012 |
| WO | WO 2012-162057 | 11/2012 |

OTHER PUBLICATIONS

International Search Report for PCT International Application No. PCT/US2012/038026, mailed on Jan. 3, 2013, 7 pages.

\* cited by examiner

LASER-PERSONALIZABLE SECURITY ARTICLES

CROSS REFERENCE TO RELATED APPLICATIONS

The application is a national stage filing under 35 U.S.C. 371 of PCT/US2012/038026, filed May 16, 2012, which claims priority to U.S. Provisional Application No. 61/488,205, filed May 20, 2011, the disclosure of which is incorporated by reference in its/their entirety herein.

FIELD OF THE DISCLOSURE

The present disclosure relates generally to the field of security articles and methods of preparing security articles. Specifically, this disclosure relates to security articles that contain a security feature that is a composite image, and that can have laser-personalized security information added to the article.

BACKGROUND

Security articles have been prepared that include multiple layers of sheeting materials. Sheeting materials having a graphic image or other mark have been widely used, particularly as security labels or laminates for authenticating an article or document. For example, sheetings such as those described in U.S. Pat. Nos. 3,154,872; 3,801,183; 4,082,426; and 4,099,838 have been used as validation stickers for vehicle license plates, and as security films for driver's licenses, government documents, tape cassettes, playing cards, beverage containers, and the like. Other uses include graphics applications for identification purposes such as on police, fire or other emergency vehicles, in advertising and promotional displays and as distinctive labels to provide brand enhancement.

Another form of imaged sheeting is disclosed in U.S. Pat. No. 4,200,875 (Galanos). Galanos discloses the use of a particularly "high-gain retroreflective sheeting of the exposed-lens type," in which images are formed by laser irradiation of the sheeting through a mask or pattern. That sheeting comprises a plurality of transparent glass microspheres partially embedded in a binder layer and partially exposed above the binder layer, with a metal reflective layer coated on the embedded surface of each of the plurality of microspheres. The binder layer contains carbon black, which is said to minimize any stray light that impinges on the sheeting while it is being imaged. The energy of the laser beam is further concentrated by the focusing effect of the microlenses embedded in the binder layer.

The images formed in the retroreflective sheeting of Galanos can be viewed if, and only if, the sheeting is viewed from the same angle at which the laser irradiation was directed at the sheeting. That means, in different terms, that the image is only viewable over a very limited observation angle. For that and other reasons, there has been a desire to improve certain properties of such a sheeting.

As early as 1908, Gabriel Lippmann invented a method for producing a true three-dimensional image of a scene in lenticular media having one or more photosensitive layers. That process, known as integral photography, is also described in De Montebello, "Processing and Display of Three-Dimensional Data II" in Proceedings of SPIE, San Diego, 1984. In Lippmann's method, a photographic plate is exposed through an array of lenses (or "lenslets"), so that each lenslet of the array transmits a miniature image of the scene being reproduced, as seen from the perspective of the point of the sheet occupied by that lenslet, to the photosensitive layers on a photographic plate. After the photographic plate has been developed, an observer looking at the composite image on the plate through the lenslet array sees a three-dimensional representation of the scene photographed. The image may be in black and white or in color, depending on the photosensitive materials used.

Because the image formed by the lenslets during exposure of the plate has undergone only a single inversion of each miniature image, the three-dimensional representation produced is pseudoscopic. That is, the perceived depth of the image is inverted so that the object appears "inside out." This is a major disadvantage, because to correct the image it is necessary to achieve a second optical inversion. These methods are complex, involving multiple exposures with a single camera, or multiple cameras, or multi-lens cameras, to record a plurality of views of the same object, and require extremely accurate registration of multiple images to provide a single three-dimensional image. Further, any method that relies on a conventional camera requires the presence of a real object before the camera. This further renders that method ill-adapted for producing three-dimensional images of a virtual object (meaning an object that exists in effect, but not in fact). A further disadvantage of integral photography is that the composite image must be illuminated from the viewing side to form a real image that may be viewed.

Another form of imaged sheeting is disclosed in U.S. Pat. No. 6,288,842 (Florczak et al.). Florczak et al. discloses microlens sheeting with composite images, in which the composite image floats above or below the sheeting, or both. The composite image may be two-dimensional or three-dimensional. Methods for providing such sheeting, including by the application of radiation to a radiation sensitive material layer adjacent the microlenses, are also disclosed. This patent discloses that images are created as a result of a compositional change, a removal or ablation of the material, a phase change, or a polymerization of the coating disposed adjacent to one side of the microlens layer or layers.

US Patent Publication No. 2007/0081254 (Endle et al.) also discloses microlens sheeting with composite images, in which the composite image floats above or below the sheeting, or both. The composite image may be two-dimensional or three-dimensional. Methods for providing such sheeting are also disclosed.

U.S. Pat. No. 5,712,731, "Security Device for Security Documents Such as Bank Notes and Credit Cards," (Drinkwater et al.) discloses a security device that includes an array of microimages which, when viewed through a corresponding array of substantially spherical microlenses, generates a magnified image. In some cases, the array of microlenses is bonded to the array of microimages.

PCT Patent Application Publication, WO 03/061983 A1, "Micro-Optics For Article Identification" discloses methods and compositions for identification and counterfeit deterrence using non-holographic micro-optics and microstructures having a surface relief greater than a few microns.

SUMMARY

Disclosed herein are laser-personalizable security articles, laser-personalized security articles and methods of preparing laser-personalizable security articles. In some embodiments the laser-personalizable security article comprises a multi-layer security document and an optically transparent, removable, conformable layer. The multi-layer security document comprises an optically transparent cover layer, a composite image and an imagable layer adjacent to the cover layer. The optically transparent cover layer comprises a first surface, a second surface, and a thickness between the first surface and the second surface. The first surface of the cover layer is at least partially a microstructured surface, where the microstructured surface forms microlenses or a lenticular surface. The composite image comprises a collection of complete or partial images located such that when viewed through the microstructured surface of the cover layer, the collection of complete or partial images forms the composite image. The composite image is located on or within the second surface of the cover layer. The imagable layer comprises a laser imagable layer. In some embodiments, the optically transparent, removable, conformable layer comprises a processing tape containing an optically transparent pressure sensitive adhesive and an optically transparent backing layer. The removable, conformable layer sufficiently wets out on the microstructured surface to render the microstructured surface invisible to a writing laser.

Also disclosed are laser-personalized multi-layer security articles that comprise the laser-personalizable security articles described above that have been laser imaged and the optically transparent, removable, conformable layer has been removed. These articles comprise an optically transparent cover layer, a composite image and an imaged layer adjacent to the cover layer. There are no adhesive layers between the cover layer and the imaged layer. The optically transparent cover layer comprises a first surface, a second surface, and a thickness between the first surface and the second surface. The first surface of the cover layer is at least partially a microstructured surface, where the microstructured surface forms microlenses or a lenticular surface. The composite image comprises a collection of complete or partial images located such that when viewed through the microstructured surface of the cover layer, the collection of complete or partial images forms the composite image. The composite image is located on or within the second surface of the cover layer. The imaged layer comprises at least one laser imaged two dimensional image.

Also disclosed are methods of preparing laser-personalizable security articles. These methods include providing a layer at least partially covered with a microstructured surface, and laminating a processing tape to the microstructured surface of the layer to form a microstructured surface layer/processing tape laminate. The processing tape comprises an optically transparent backing; and an optically transparent pressure sensitive adhesive layer at least partially coated on the backing. The pressure sensitive adhesive layer sufficiently wets out on the microstructured surface to render the microstructured surface invisible to a writing laser.

In some embodiments, the layer at least partially covered with a microstructured surface comprises the cover layer of a multi-layer security document. The multi-layer security document comprises an optically transparent cover layer, a composite image and an imagable layer adjacent to the cover layer. The optically transparent cover layer includes a first surface, a second surface, and a thickness between the first surface and the second surface. The first surface of the cover layer is at least partially a microstructured surface, where the microstructured surface forms microlenses or a lenticular surface. The composite image comprises a collection of complete or partial images located such that when viewed through the microstructured surface of the cover layer, the collection of complete or partial images forms the composite image. The composite image is located on or within the second surface of the cover layer. The imagable layer comprises a laser imagable layer.

In some embodiments, the layer at least partially covered with a microstructured surface comprises microlens sheeting. These methods further comprise laminating the microstructured surface layer/processing tape laminate to a substrate at an elevated temperature and pressure to form a security sheet, and die cutting the security sheet to form a laser-personalizable security article. The substrate comprises at least an imagable layer, wherein the imagable layer is laser imagable.

BRIEF DESCRIPTION OF THE DRAWINGS

The present application may be more completely understood in consideration of the following detailed description of various embodiments of the disclosure in connection with the accompanying drawings.

Figure 1:
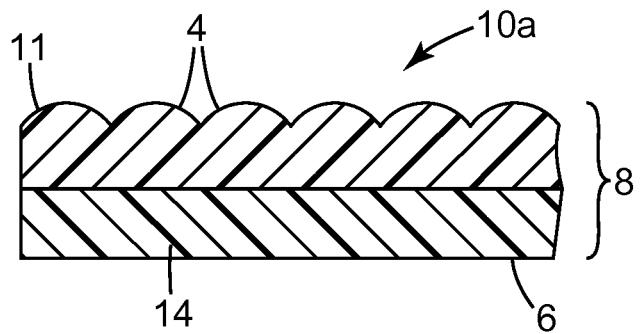
FIG. 1 is an enlarged cross sectional view of a microlens sheeting comprising a plano-convex base sheet.

In the following description of the illustrated embodiments, reference is made to the accompanying drawings, in which is shown by way of illustration, various embodiments in which the disclosure may be practiced. It is to be understood that the embodiments may be utilized and structural changes may be made without departing from the scope of the present disclosure. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Security articles are becoming increasingly important. Examples of security articles include identification documents (ID documents) and security documents. The term "ID documents" is broadly defined and is intended to include, but not be limited to, for example, passports, driver's licenses, national ID cards, social security cards, voter registration and/or identification cards, birth certificates, police ID cards, border crossing cards, security clearance badges, security cards, visas, immigration documentation and cards, gun permits, membership cards, phone cards, stored value cards, employee badges, debit cards, credit cards, and gift certificates and cards. ID documents are also sometimes referred to as "security documents". The articles of this disclosure may be the ID document or may be part of the ID document. Other articles may be described as security documents, and typically contain color images and include items of value, such as, for example, currency, bank notes, checks, and stock certificates, where authenticity of the item is important to protect against counterfeiting or fraud, as well as articles which can be used to produce informative, decorative, or recognizable marks or indicia on product tags, product packaging, labels, charts, maps and the like.

Some of the desirable features for security articles are ready authentication and resistance to tampering. Ready authentication can be achieved through the use of indicia that is readily apparent and checked and yet is difficult to copy or falsify. Examples of such indicia include, for example three dimensional floating images in sheeting where the image appears to be above, below, or in the plane of the sheeting. Such images are difficult to counterfeit because the image is not readily reproduced by straightforward methods such as photocopying or photography. Examples of such images include, for example, three dimensional floating images present in some state driver's licenses where a series of three dimensional floating images representing the state name or other logo are present across the license card to verify that the card is an official license and not a counterfeit. Such three dimensional floating images are readily seen and verified.

Resistance to tampering can also be achieved in a variety of ways including permanently bonding or laminating elements of the security article such that they cannot be taken apart without noticeable evidence of tampering. Among the techniques useful to achieve this bonding or lamination include the use of curable adhesives that form a permanent bond and the use of the combined forces of heat and pressure to laminate together layers in such a way that delamination would destroy the article.

Many security articles have multiple levels of security. For example, they may have a three dimensional floating image to verify that the article is authentic in addition to personal information such as a photograph, signature or other personal information. In this way, the presence of the three dimensional floating image provides validation to the authenticity of the personal information. For example, many driver's licenses contain a three dimensional floating image to verify that it is an authentic state issued license, as well as personal information such as a photograph, signature, name, address, etc of the person to whom the license is issued. The three dimensional floating image makes it difficult to copy or alter the license card. The permanent bonding of the layers of the card makes it difficult to disassemble and alter the personal information.

However, having multiple levels of security adds to the complexity of forming the security articles. Because the three dimensional floating image and personalized information are present within internal layers of the article, there are generally two ways of preparing the security article. One method is to prepare the layers containing the three dimensional floating image and the personalized information and laminate them together to form the security article. There are a number of drawbacks to this process. This process requires specialized equipment such as adhesive coaters and laminators or equipment to apply heat and pressure to layers to form the lamination such as a heated platen press. These types of equipment work well with large sheet materials but are not very efficient for preparing individual security articles. Also, it is not desirable to have these types of industrial equipment in the places where the personalized information is typically gathered, such as for example, a courthouse or other government office location. Therefore, the personalized information would have to be sent to an industrial location, the personalized information transferred to the proper layer and the security document generated. This can be a very time consuming and labor intensive process and requires that the personalized information, which may be and often is, sensitive information, leaves the hands of the person collecting the information and be placed at risk of copying or errors in transferring. It is often more desirable for the security article to be generated at the same location where the information is gathered.

In order for the security article to be generated at the same location where the information is gathered, a second method of generating a security article is desirable. In this method, a preformed article is prepared and the desired personal information and security features are written onto the preformed article. In this method, "blank" cards are generated as multilayer articles that have the three dimensional floating image but no personalized information. These blank cards can be prepared as large sheets using the industrial processes described above and die cut to the desired size. The personalized information can be then written onto the security article with, for example, a laser. The use of lasers to write personalized information onto a security article is a process suitable for individual security articles in a government office setting, unlike the lamination or platen press operations described above.

An added difficulty of generating personalized articles with multiple layers of security is the method by which the three dimensional floating image is generated. Typically the surface of the security article has a microstructured surface that forms microlenses or a lenticular surface. The microlenses or lenticular surface makes the image appear three dimensional and gives it the appearance of floating. These types of images and microlenses are described, for example, in U.S. Pat. No. 6,288,842 (Florczak et al.) and US Patent Publication No. 2007/0081254 (Endle et al.). However, this microstructured surface can also interfere with the laser beam that is used to write the personalized information onto the security article. This difficulty can be overcome by having the microstructured surface only on the part of the surface of the security article where the three dimensional floating image is located and have the rest of the surface be non-microstructured to permit writing with a laser.

There are a variety of reasons why it is not desirable and can be impractical to have only the portion of the surface of the security article where a three dimensional floating image is located have a microstructured surface. It can make processing of the large scale sheets from which the security articles are produced more difficult by requiring, for example, exact alignment of the image with the microstructured surface. Also, in many instances it may be desirable to have more than a single three dimensional floating image, such as a series of such images across the entire article. It may also be desired that the three dimensional floating image and the personalized information overlap or be near each other. Additionally, the ability of the microstructured surface to frustrate laser writing is itself a security feature, blocking laser tampering of formed cards.

In this disclosure, laser-personalizable security articles are presented along with methods of making these laser-personalizable security articles and the use of them to form personalized security articles.

Unless otherwise indicated, all numbers expressing feature sizes, amounts, and physical properties used in the specification and claims are to be understood as being modified in all instances by the term "about" Accordingly, unless indicated to the contrary, the numerical parameters set forth in the foregoing specification and attached claims are approximations that can vary depending upon the desired properties sought to be obtained by those skilled in the art utilizing the teachings disclosed herein. The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

As used herein, the term "adjacent" when referring to layers or films, means that the layers or films are in close proximity to each other with no empty space between them. The layers or films may be touching or there may be intervening layers or films.

The term "adhesive" as used herein refers to polymeric compositions useful to adhere together two adherends. Examples of adhesives are pressure sensitive adhesives. Pressure sensitive adhesive compositions are well known to those of ordinary skill in the art to possess properties including the following: (1) aggressive and permanent tack at room temperature, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

Unless otherwise indicated, "optically transparent" refers to an article, film or adhesive that has a high light transmittance over at least a portion of the visible light spectrum (about 400 to about 700 nm). The term "transparent film" refers to a film having a thickness and when the film is disposed on a substrate, an image (disposed on or adjacent to the substrate) is visible through the thickness of the transparent film. In many embodiments, a transparent film allows the image to be seen through the thickness of the film without substantial loss of image clarity. In some embodiments, the transparent film has a matte or glossy finish.

Disclosed herein are laser-personalizable security articles that comprise a multi-layer security document, and an optically transparent, removable, conformable layer such as a processing tape. The multi-layer security document comprises an optically transparent cover layer, a composite image, and an imagable layer. The multi-layer security document is so arranged that the composite image is a first level of security, and the imagable layer is designed to permit personalized laser writing to give a second level of security. Besides these two levels of security, the security articles of this disclosure may also contain optional additional security features that have been developed to authenticate documents of value and thus prevent forgers from producing a document which resembles the authentic document. These optional additional security features include overt, covert, or electronic security features. Overt security features include holograms and other diffractive optically variable images, embossed images, Guilloche security print, rainbow Guilloche security print, color-shifting security print, and colorshifting films. Covert security features include images only visible under certain conditions such as inspection under light of a certain wavelength, polarized light, retroreflected light, or magnification. Electronic security features include biometric data stored on contactless, contact, or dual interface modules. Even more sophisticated systems require specialized electronic equipment to inspect the document and verify its authenticity. Each of the components of the laser-personalizable security articles is described in greater detail below.

The multi-layer security document includes an optically transparent cover layer. This cover layer has a first surface, a second surface, and a thickness between the first surface and the second surface. The cover layer typically is a film layer, but it may also be for example a substrate layer, meaning that it is more rigid than a film layer.

Figure 2:
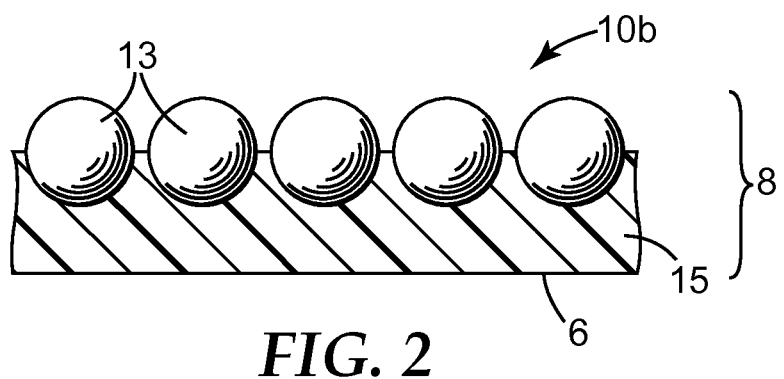
FIG. 2 is an enlarged cross sectional view of an "exposed lens" microlens sheeting.

Particularly suitable cover layers are microlens sheeting such as described in U.S. Pat. No. 6,288,842 (Florczak et al.) and US Patent Publication No. 2007/0081254 (Endle et al.). The microlens sheeting comprises one or more discrete layers of microlenses with a layer of material adjacent to one side of the microlens layer or layers. For example, FIG. 1 illustrates one embodiment of a suitable type of microlens sheeting 10a. This sheeting comprises a transparent cover layer 8 having first and second surfaces, the second surface 6 being substantially planar and the first surface 11 having an array of substantially spherical or aspherical microlenses 4. The microlens layer 8 may optionally comprise sub-layer 14 (described below), or microlens layer 8 may be a single layer. The second surface 6 comprises a composite image as described in more detail below. FIG. 2 illustrates another embodiment of a suitable type of microlens sheeting 10b. The shape of the microlenses and thickness of the base sheet and their variability are selected such that light appropriate for viewing the sheeting is focused approximately at the second surface 6. In this embodiment, the microlens sheeting of microlens layer 8 includes a monolayer of transparent microspheres 13 that are partially embedded in a material layer 15, which is also typically a bead binder layer, such as a polymeric material. The layer of material 15 includes a second surface 6 comprising a composite image as described in more detail below. The microspheres 13 are transparent to the wavelengths of light in which the composite image will be viewed. This type of sheeting is described in greater detail in U.S. Pat. No. 3,801,183, except where the bead bond layer is very thin, for instance, to the extent where the bead bond layer is only between the beads, or occupying the interstitial spaces between the beads. Alternatively, this type of sheeting can be made by using microspheres of an appropriate optical index for focusing radiation approximately on the second surface 6 of the layer of material 15 when the bead bond is of the thickness taught in U.S. Pat. No. 3,801,183. Such microspheres include polymethyl methylacrylate beads, which are commercially available from Esprix Technologies based in Sarasota, Fla.

The microlenses of the sheeting 10a and 10b typically have image forming refractive elements in order for image formation (described in more detail below) to occur; this is generally provided by forming spherically or aspherically shaped features. Other useful materials that provide a gradient refractive index (GRIN) will not necessarily need a curved surface to refract light. The microlenses may have any symmetry, such as cylindrical or spherical, provided real images are formed by the refraction surfaces. The microlenses themselves can be of discrete form, such as round plano-convex lenslets, round double convex lenslets, Fresnel lenslets, diffractive lenslets, rods, microspheres, beads, or cylindrical lenslets. Materials from which the microlenses can be formed include glass, polymers, minerals, crystals, semiconductors and combinations of these and other materials. Non-discrete microlens elements may also be used. Thus, microlenses formed from a replication or embossing process (where the surface of the sheeting is altered in shape to produce a repetitive profile with imaging characteristics) can also be used.

Microlenses with a uniform refractive index of between 1.4 and 3.0 over the visible and infrared wavelengths are typical, more typically between 1.4 and 2.5, and even more typically between 1.45 and 1.55. The refractive power of the microlenses, whether the individual microlenses are discrete or replicated, and regardless of the material from which the microlenses are made, is desirably such that the light incident upon the optical elements will focus on or near the second surface 6 of microlens layer 8. In certain embodiments, the microlenses typically form a demagnified real image at the appropriate position on that layer. The construction of the microlens sheeting provides the necessary focusing conditions so that energy incident upon the front surface of the microlens sheeting is approximately focused on or near the second surface 6 of microlens layer 8.

Microlenses with diameters ranging from 15 micrometers to 275 micrometers are particularly suitable, though other sized microlenses may be used. Good composite image resolution can be obtained by using microlenses having diameters in the smaller end of the aforementioned range for composite images that are to appear to be spaced apart from the microlens layer by a relatively short distance, and by using larger microlenses for composite images that are to appear to be spaced apart from the microlens layer by larger distances. Other microlenses, such as plano-convex, spherical or aspherical microlenses having lenslet dimensions comparable to those indicated for the microlenses, can be expected to produce similar optical results. Cylindrical lenses having lenslet dimensions comparable to those indicated for the microlenses can be expected to produce similar optical results, although different or alternative imaging optics train may be required.

As noted above, a layer of material 14 in FIG. 1 may be provided adjacent to the microlenses in the microlens sheeting 10*a*. This layer of material is referred to herein as a "spacing layer" or "spacing film". Suitable materials for the spacing layer 14 in the sheeting 10*a* include silicone, polyester, polyurethane, polycarbonate, polypropylene, or any other polymer capable of being made into sheeting or being supported by the microlens sheeting 10*a*. In one embodiment, microlens sheeting 10*a* may include microlens layer 8 and a spacing layer 14 that are made from different materials. For example, the microlens layer may include acrylates, and the spacing layer may include polyester. In other embodiments, the sheeting 10*a* may include a microlens layer and a spacing layer that are made from the same materials. For example, the microlens and spacing layer of the microlens layer 8 may be made of silicone, polyester, polyurethane, polycarbonate, polypropylene, or any other polymer capable of being made into sheeting, and may be formed by methods of mechanical embossing, replication or molding.

As described above, the thickness of the cover layer is selected such that the focal plane of the microlenses is at or near the location of the second surface 6.

Because the microlens sheeting forms an exterior surface of a security article it is desirable that the microlens sheeting be durable to withstand the processing steps to form the security article as well as normal use conditions for the security article. The process to prepare security articles may involve steps such as lamination with heat and pressure, and therefore it is desirable that the surface be sufficiently robust to withstand these conditions. In some embodiments, the microlens sheeting is prepared from a crosslinked material to provide dimensional stability, such as, for example, a crosslinked (meth)acrylate material. In some embodiments, a highly crosslinked (meth)acrylate material is used which contains highly functionalized (meth)acrylate monomers. By highly functionalized (meth)acrylate monomers, is it meant (meth)acrylate monomers with a functionality greater than two, such as, for example, trifunctional (meth)acrylate monomers, tetrafunctional (meth)acrylate monomers, or pentafunctional (meth)acrylate monomers.

Additionally, because the microlens sheeting not only forms an exterior surface of a security article but also because the surface is contacted by a processing tape comprising a pressure sensitive adhesive, it may be desirable to have a surface coating on the microlens surface of the cover layer. This surface coating can be useful to prevent soiling, scratching, etc of the microlens surface and can aid in the removal of the processing tape, by, for example, lowering the surface energy of the microstructured surface. A wide variety of surface coatings are suitable as long as they do not interfere with the optical and mechanical properties of the microstructured surface of the microlens sheeting.

In some embodiments, it is desirable to have a coating on the microstructured surface that is a hydrophobic surface coating. Generally, a coating may be considered "hydrophobic" when the water contact angle, as measured using standard water contact angle measurements, is greater than 90 degrees, 100 degrees or even 110 degrees. Hydrophobic coatings may further be understood as generally nonwettable by water, as water beads off of the surface of the coating upon contact. Such coatings also often display low contact angle hysteresis, that is, a small difference between the advancing and receding contact angles of the water droplet.

Typically, the hydrophobic coatings are prepared by coating the microstructured surface with a curable composition and then curing and drying the composition to form a thin hydrophobic coating on the surface of the microstructures. The curable composition comprises a curable mixture comprising i) a majority of at least one multifunctional (meth) acrylate monomer, ii) at least one perfluoropolyether additive having a perfluoropolyether moiety and at least one free radically reactive group, iii) surface treated nanoparticles, and iv) an initiator, dissolved in a solvent media. The curable composition may also comprise v) a free radically polymerizable monomer that may be fluorocarbon-based or siloxane-based.

The hydrophobic coating composition comprises at least 30 wt %, 50 wt %, 60 wt %, 70 wt %, 80 wt %, or 90 wt % of one or more multifunctional free radically polymerizable multifunctional (meth)acrylate monomers and oligomers. As used herein "free radically polymerizable" refers to groups that can undergo free radical polymerization. Examples of free radically polymerizable groups include acrylates, methacrylates, vinyl groups and the like. As used herein, the term "(meth)acrylate" is used to refer to both acrylates (containing acryl groups) and methacrylates (containing methacryl groups). Examples of suitable multifunctional (meth)acrylate monomers and oligomers include:

(a) di(meth)acryl containing compounds such as 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated bisphenol A diacrylate, hydroxypivalaldehyde modified trimethylolpropane diacrylate, neopentyl glycol diacrylate, polyethylene glycol diacrylate, propoxylated neopentyl glycol diacrylate, tetraethylene glycol diacrylate, tricyclodecanedimethanol diacrylate, triethylene glycol diacrylate, tripropylene glycol diacrylate;

(b) tri(meth)acryl containing compounds such as glycerol triacrylate, trimethylolpropane triacrylate, ethoxylated triacrylates (e.g., ethoxylated trimethylolpropane triacrylate), propoxylated triacrylates (e.g., propoxylated glyceryl triacrylate, propoxylated trimethylolpropane triacrylate), trimethylolpropane triacrylate, tris(2-hydroxyethyl)isocyanurate triacrylate;

(c) higher functionality (meth)acryl containing compounds such as ditrimethylolpropane tetraacrylate, dipentaerythritol pentaacrylate, pentaerythritol triacrylate, ethoxylated pentaerythritol tetraacrylate, and caprolactone modified dipentaerythritol hexaacrylate.

Oligomeric (meth)acryl compounds such as, for example, urethane acrylates, polyester acrylates, and epoxy acrylates can also be employed Such (meth)acrylate compounds are widely available from vendors such as, for example, Sartomer Company of Exton, Pa.; UCB Chemicals Corporation of Smyrna, Ga.; and Aldrich Chemical Company of Milwaukee, Wis.

The hydrophobic coating composition further comprises at least one perfluoropolyether additive. As used herein, the term "fluorinated" when used in conjunction with an alkyl, alkylene or polyether group refers to having at least one hydrogen atom replaced with a fluorine atom. The term "perfluorinated" refers to where all of the hydrogen atoms are replaced by fluorine atoms. For example, the term "fluorinated polyether" refers to an oxyalkylene having at least one hydrogen atom replaced with a fluorine atom. Where all of the hydrogen atoms are replaced with fluorine atoms the group is referred to as "perfluoropolyether".

In some embodiments, the perfluoropolyether additive is a perfluoropolyether urethane additive. Typically the hydrophobic coating composition comprises 0.05, more typically at least 0.10 wt % solids of one or more perfluoropolyether urethane additives. The total amount of perfluoropolyether urethane additives alone, or in combination with other fluorinated additives described below, can range up to 10 wt % solids. In some embodiments, the amount of perfluoropolyether urethane additives ranges up to 0.1 wt %, 0.5 wt %, 1 wt %, 2 wt %, 3 wt %, 4 wt %, or 5 wt % solids.

Suitable perfluoropolyether urethane additives and methods of preparing them are described, for example, in US Patent Publication No. 2011/0086221 (Pokorny et al.). Typically, the perfluoropolyether urethane additive is made by first reacting a polyisocyanate with a perfluoropolyether compound containing an alcohol, thiol, or amine group. The perfluoropolyether urethane additive is then combined with a (e.g. non-fluorinated) isocyanate reactive multifunctional free radically polymerizable (meth)acrylate crosslinker. Alternatively, perfluoropolyether urethane additives can be formed by other reaction sequences such as by first reacting the polyisocyanate with a polyisocyanate reactive crosslinker, followed by the addition of the perfluoropolyether compound. Further, all three components can be concurrently coreacted.

One or more polyisocyanate materials are employed in the preparation of the perfluoropolyether urethane. A variety of polyisocyanates may be utilized in the preparation of the perfluoropolyether urethane polymeric material. "Polyisocyanate" means any organic compound that has two or more reactive isocyanate (—NCO) groups in a single molecule such as diisocyanates, triisocyanates, tetraisocyanates, etc., and mixtures thereof. Cyclic and/or linear polyisocyanate molecules may usefully be employed. For improved weathering and diminished yellowing the polyisocyanate(s) of the isocyanate component is typically aliphatic.

Useful aliphatic polyisocyanates include, for example, bis (4-isocyanatocyclohexyl) methane ($H_{12}$ MDI) such as available from Bayer Corp., Pittsburgh, Pa. under the trade designation "Desmodur W"; isophorone diisocyanate (IPDI) such as commercially available from Hills America, Piscataway, N.J.; hexamethylene diisocyanate (HDI) such as commercially available from Aldrich Chemical Co., Milwaukee, Wis.; trimethyl hexamethylene diisocyanate such as commercially available from Degussa, Corp., Dusseldorf, Germany under the trade designation "Vestanate TMDI"; and m-tetramethylxylene diisocyanate (TMXDI) such as commercially available from Aldrich Chemical Co., Milwaukee, Wis. Although typically less desirable, aromatic isocyanates such as diphenylmethane diisocyanate (MDI) such as commercially available from Bayer Corp., Pittsburgh, Pa. under the trade designation "Mondur M"; toluene 2,4-diisocyanate (TDI) such as commercially available from Aldrich Chemical Co., Milwaukee, Wis., and 1,4-phenylene diisocyanate are also useful.

Particularly suitable polyisocyanates include derivatives of the above-listed monomeric polyisocyanates. These derivatives include, but are not limited to, polyisocyanates containing biuret groups, such as the biuret adduct of hexamethylene diisocyanate (HDI) available from Bayer Corp. under the trade designation "Desmodur N-100", polyisocyanates based on HDI containing isocyanurate groups, such as that available from Bayer Corp. under trade designation "Desmodur N-3300", as well as polyisocyanates containing urethane groups, uretdione groups, carbodiimide groups, allophonate groups, and the like. These derivatives are desirable as they are polymeric, exhibit very low vapor pressures and are substantially free of isocyanate monomer.

Other polyisocyanates that may be used are available from Bayer Polymers LLC of Pittsburgh, Pa. under the trade designations "Desmodur TPLS2294", and "Desmodur N 3600"

One or more isocyanate reactive perfluoropolyether materials are employed in the preparation of the perfluoropolyether urethane. Various isocyanate reactive perfluoropolyethers materials can be utilized. The synthesis of various perfluoropolyether materials having (e.g. terminal) isocyanate reactive groups such as OH, SH or NHR wherein R is H of an alkyl group of 1 to 4 carbon atoms is known. For example, a methyl ester material (e.g. having an average molecular weight of 1,211 g/mol) for preparation of the alcohol can be prepared according to the method reported in U.S. Pat. No. 3,250,808 (Moore et al.), the disclosure of which is incorporated herein by reference, with purification by fractional distillation. Perfluoropolyether alcohol materials can be made by a procedure similar to that described in U.S. Publication No. 2004/0077775, filed May 24, 2002. Perfluoropolyether alcohol materials having an SH group can be made using this same process by use of aminoethane thiol rather than aminoethanol. Perfluoropolyether amine materials can be synthesized as described in US 2005/0250921.

The perfluoropolyether urethane material is desirably prepared from an isocyanate reactive HFPO— material. Unless otherwise noted, "HFPO—" refers to the end group F(CF (CF$_3$)CF$_2$O)$_a$CF(CF$_3$)— of the methyl ester F(CF(CF$_3$) CF$_2$O)$_a$CF(CF$_3$)C(O)OCH$_3$, wherein "a" averages 2 to 15. In some embodiments, a averages between 3 and 10 or a averages between 5 and 8. Such species generally exist as a distribution or mixture of oligomers with a range of values for a, so that the average value of a may be non-integer. For example, in one embodiment, "a" averages 6.2. The molecular weight of the HFPO— perfluoropolyether material varies depending on the number ("a") of repeat units from about 940 g/mole to about 1600 g/mole, with 1100 g/mole to 1400 g/mole being more typical.

The curable composition contains surface modified inorganic particles that add mechanical strength and durability to the resultant coating. The particles are typically substantially spherical in shape and relatively uniform in size. The particles can have a substantially monodisperse size distribution or a polymodal distribution obtained by blending two or more substantially monodisperse distributions. The inorganic oxide particles are typically non-aggregated (substantially discrete), as aggregation can result in precipitation of the inorganic oxide particles or gelation of the hardcoat. The inorganic oxide particles are typically colloidal in size, having an average particle diameter of about 0.001 to about 0.2 micrometers, less than about 0.05 micrometers, or less than about 0.10 micrometers. These size ranges facilitate dispersion of the inorganic oxide particles into the binder resin and provide ceramers with desirable surface properties and optical clarity. The average particle size of the inorganic oxide particles can be measured using transmission electron microscopy to count the number of inorganic oxide particles of a given diameter. The inorganic oxide particles can consist essentially of or consist of a single oxide such as silica, or can comprise a combination of oxides, such as silica and aluminum oxide, or a core of an oxide of one type (or a core of a material other than a metal oxide) on which is deposited an oxide of another type. Silica is a common inorganic particle. The inorganic oxide particles are often provided in the form of a sol containing a colloidal dispersion of inorganic oxide particles in liquid media. The sol can be prepared using a variety of techniques and in a variety of forms including hydrosols (where water serves as the liquid medium), organosols (where organic liquids so serve), and mixed sols (where the liquid medium contains both water and an organic liquid), e.g., as described in U.S. Pat. No. 5,648,407 (Goetz et al.); U.S. Pat. No. 5,677,050 (Bilkadi et al.) and U.S. Pat. No. 6,299,799 (Craig et al.). Aqueous sols (e.g. of amorphous silica) can be employed. Sols generally contain at least 2 wt %, at least 10 wt %, at least 15 wt %, at least 25 wt %, and often at least 35 wt % colloidal inorganic oxide particles based on the total weight of the sol. The amount of colloidal inorganic oxide particle is typically no more than 70 wt %, 50 wt % (e.g. 45 wt %). The surface of the inorganic particles can be "acrylate functionalized" as described in Bilkadi et al. The sols can also be matched to the pH of the binder, and can contain counterions or water-soluble compounds (e.g., sodium aluminate), all as described in Kang et al. '798.

Various high refractive index inorganic oxide particles can be employed such as for example zirconia ("$ZrO_2$"), titania ("$TiO_2$"), antimony oxides, alumina, tin oxides, alone or in combination. Mixed metal oxide may also be employed. Zirconias for use in the high refractive index layer are available from Nalco Chemical Co. under the trade designation "Nalco OOSSOO8" and from Buhler AG Uzwil, Switzerland under the trade designation "Buhler zirconia Z—WO sol". Zirconia nanoparticle can also be prepared such as described in U.S. patent application Ser. No. 11/027,426 filed Dec. 30, 2004 and U.S. Pat. No. 6,376,590.

The inorganic nanoparticles are treated with a surface treatment agent. Surface treating the nano-sized particles can provide a stable dispersion in the polymeric resin. Generally, the surface treatment stabilizes the nanoparticles so that the particles will be well dispersed in the polymerizable resin and results in a substantially homogeneous composition. Furthermore, the nanoparticles can be modified over at least a portion of its surface with a surface treatment agent so that the stabilized particle can copolymerize or react with the polymerizable resin during curing. The incorporation of surface modified inorganic particles is amenable to covalent bonding of the particles to the free radically polymerizable organic components, thereby providing a tougher and more homogeneous polymer/particle network.

In general, a surface treatment agent has a first end that will attach to the particle surface (covalently, ionically or through strong physisorption) and a second end that imparts compatibility of the particle with the resin and/or reacts with resin during curing. Examples of surface treatment agents include alcohols, amines, carboxylic acids, sulfonic acids, phosphonic acids, silanes and titanates. The desired type of treatment agent is determined, in part, by the chemical nature of the metal oxide surface. Silanes are desirable for silica and other for siliceous fillers. Silanes and carboxylic acids are desirable for metal oxides such as zirconia. The surface modification can be done either subsequent to mixing with the monomers or after mixing. It is desirable in the case of silanes to react the silanes with the particle or nanoparticle surface before incorporation into the resin. The required amount of surface modifier is dependant upon several factors such as particle size, particle type, modifier molecular wt, and modifier type. In general, it is desirable that approximately a monolayer of modifier is attached to the surface of the particle. The attachment procedure or reaction conditions required also depend on the surface modifier used. For silanes it is desirable to surface treat at elevated temperatures under acidic or basic conditions for from 1-24 hr approximately. Surface treatment agents such as carboxylic acids may not require elevated temperatures or extended time.

Representative embodiments of surface treatment agents suitable for the compositions include compounds such as, for example, isooctyl trimethoxy-silane, N-(3-triethoxysilylpropyl) methoxyethoxyethoxyethyl carbamate, N-(3-triethoxysilylpropyl) methoxyethoxyethoxyethyl carbamate, 3-(methacryloyloxy)propyltrimethoxysilane, 3-acryloxypropyltrimethoxysilane, 3-(methacryloyloxy)propyltriethoxysilane, 3-(methacryloyloxy) propylmethyldimethoxysilane, 3-(acryloyloxypropyl)methyldimethoxysilane, 3-(methacryloyloxy)propyldimethylethoxysilane, 3-(methacryloyloxy) propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltri-isopropenoxysilane, vinyltris(2-methoxyethoxy)silane, styrylethyltrimethoxysilane, mercaptopropyltrimethoxysilane, 3-glycidoxypropyltrimethoxysilane, acrylic acid, methacrylic acid, oleic acid, stearic acid, dodecanoic acid, 2-[2-(2-methoxyethoxy)ethoxy]acetic acid (MEEAA), beta-carboxyethylacrylate (BCEA), 2-(2-methoxyethoxy)acetic acid, methoxyphenyl acetic acid, and mixtures thereof.

The surface modification of the particles in the colloidal dispersion can be accomplished in a variety of known ways, such as described in, for example, U.S. Pat. No. 6,376,590.

Particularly suitable surface modifying agents include those surface modifying agents having a functional group that is copolymerizable with the multifunctional free radically polymerizable monomer (e.g. having an acrylate, methacrylate, or vinyl group). Examples of such surface modifying agents include those available from GE Advanced Materials under the trade name "SILQUEST" such as SILQUEST A-174.

To facilitate curing, the curable compositions further comprise at least one free-radical thermal initiator and/or photoinitiator. Typically, it comprises less than about 10 percent by weight, more typically less than about 5 percent of the polymerizable composition, based on the total weight of the polymerizable composition. Free-radical curing techniques are well known in the art and include, for example, thermal curing methods as well as radiation curing methods such as electron beam or ultraviolet radiation. Further details concerning free radical thermal and photopolymerization techniques may be found in, for example, U.S. Pat. No. 4,654,233 (Grant et al.); U.S. Pat. No. 4,855,184 (Klun et al.); and U.S. Pat. No. 6,224,949 (Wright et al.). Useful free-radical thermal initiators include, for example, azo, peroxide, persulfate, and redox initiators, and combinations thereof. Useful free-radical photoinitiators include, for example, those known as useful in the UV cure of acrylate polymers such as described in WO2006/102383.

The curable composition may also contain additional free radically polymerizable monomers. Especially suitable free radically polymerizable monomers include fluorocarbon-based or siloxane-based monomers. As used herein, the term "fluorocarbon-based" refers to monomers that contain at least some units of fluoroalkyl groups ($-(CF_2)_n-$), and may also contain other groups or atoms such as oxygen atoms. As used herein, the term "siloxane-based" refers to monomers that contain at least some siloxane ($-SiR_2O-$) repeat units. Herein the terms "siloxane" and "silicone" are used interchangeably.

Examples of suitable free radically polymerizable fluorocarbon-based monomers include elastomeric monomers such as those available from DYNEON such as "FPO 3740".

Examples of suitable free radically polymerizable siloxane-based monomers include elastomeric monomers such as silicone (meth)acrylates. Silicone (meth)acrylates generally comprise a polydimethylsiloxane (PDMS) backbone and an alkoxy side chain with a terminal (meth)acrylate group. Such silicone (meth)acrylate additives are commercially available from various suppliers such as Tego Chemie under the trade designations "TEGO Rad 2300", "TEGO Rad 2250", "TEGO Rad 2300", "TEGO Rad 2500", and "TEGO Rad 2700".

The silicone (meth)acrylate additive, when used, is typically added to the curable composition at a concentration at least equal to that of the perfluoropolyether urethane additive. The concentration may range from at least about 0.10, 0.20, 0.30, 0.40, or 0.50 wt % solids of the curable composition to as much as 5, wt %, 10 wt % or 20 wt % solids. In some embodiments, the concentration of the silicone (meth)acrylate additive range from about 5× to 10× the concentration of the perfluoropolyether urethane additive or from 1 to 3 wt % solids of the curable composition.

The hydrophobic coating may be prepared in a variety of different ways, but typically the coating is prepared by preparing a curable composition, coating the curable composition on the microstructured surface, and drying and curing the coating.

The curable composition may be prepared by mixing together the curable composition components in any order. Typically, the polymerizable perfluoropolyether urethane and fluorocarbon-based or siloxane-based monomers (if used) are dispersed in an inorganic particle containing hardcoat composition in combination with an organic (non-fluorinated) solvent. Examples of suitable organic solvents include, for example: ketones such as acetone, methyl ethyl ketone (MEK), and methyl isobutyl ketone (MIBK); ethers such as diethyl ether and tetrahydrofuran (THF); and esters such as ethyl acetate.

The curable composition can be coated on the microstructured surface as a single or as multiple layers, typically a single layer coating is used. Thin coating layers can be applied using a variety of techniques, including dip coating, forward and reverse roll coating, wire wound rod coating, spray coating, and die coating. Die coaters include knife coaters, slot coaters, slide coaters, fluid bearing coaters, slide curtain coaters, drop die curtain coaters, and extrusion coaters among others. Many types of die coaters are described in the literature such as by Edward Cohen and Edgar Gutoff, Modern Coating and Drying Technology, VCH Publishers, NY 1992, ISBN 3-527-28246-7 and Gutoff and Cohen, Coating and Drying Defects: Troubleshooting Operating Problems, Wiley Interscience, NY ISBN 0-471-59810-0.

Upon coating, the coated curable composition is dried to remove the solvent and then cured for example by exposure to ultraviolet radiation (e.g. using an H-bulb or other lamp) at a desired wavelength, generally in an inert atmosphere (less than 50 parts per million oxygen) or by an electron beam.

The thickness of the one-layer hydrophobic surface layer is typically less than 0.5 micrometers, generally less than 0.3 micrometer, and more typically less than 0.2 micrometer.

On the second surface of the cover layer is located a composite image. As used herein, the term "composite image", refers to a composite image, provided by individual partially complete images and/or individual complete images associated with a number of the microlenses, that appears to be suspended, or to float above, in the plane of, and/or below the sheeting. These suspended images are referred to for convenience as floating images, and they can be located above or below the sheeting (either as two or three-dimensional images), or can be a three-dimensional image that appears above, in the plane of, and below the sheeting. The images can be in black and white or in color, and can appear to move with the observer. Unlike some holographic sheetings, imaged sheeting of the present disclosure cannot be used to create a replica of itself. Additionally, the floating image(s) can be observed by a viewer with the unaided eye. The composite image comprises a collection of complete or partial images located on the second surface of the cover layer such that when viewed through the microstructured surface of the cover layer a composite image is formed that may be for example a floating three dimensional image.

The collection of complete or partial images that form the composite image may be formed on the second surface of the cover layer using the techniques described in U.S. Pat. No. 6,288,842 (Florczak et al.) and US Patent Publication No. 2007/0081254 (Endle et al.) or within the cover layer using the techniques described in U.S. Pat. No. 7,336,422 (Dunn et al.).

The disclosure of Florczak et al. provides a method of forming a composite image on a microlens sheeting by directing diverging or converging light rays onto the microlens sheeting. The energy of the light rays is focused by the individual microlenses onto a material layer that is radiation sensitive. The focused energy modifies the radiation sensitive layer to provide an image.

The disclosure of Endle et al. also provides a method of forming a composite image on a microlens sheeting. The method comprises the steps of: providing a sheeting having an array of microlenses and a material layer adjacent the array of microlenses; providing a first donor substrate adjacent the material layer of the sheeting, where the first donor substrate is radiation sensitive; providing a radiation source; and transferring at least a portion of the first donor substrate to the sheeting using the radiation source to form individual, partially complete images on the material layer.

The composite image provides a first level of security by providing, for example, a three dimensional floating image that cannot be used to create a replica of itself, and can be observed by a viewer with the unaided eye.

Just as the composite image provides the first level of security, the imagable layer provides the second level of security, by providing a layer that is laser-personalizable such that additional, perzonalizable information can be imaged onto the imagable layer to provide a security article with a composite image and personalized security information. Depending upon the nature of the desired personalized image or images, a wide range of imagable layers are suitable for used in the security articles of this disclosure.

The imagable layer comprises a laser imagable layer. The term "laser imagable" as used herein refers to a layer or set of layers that upon exposure to laser radiation forms an image. Typically, the imagable layer is a radiation sensitive material layer.

Radiation sensitive materials useful for this disclosure include coatings and films of metallic, polymeric and semiconducting materials as well as mixtures of these. As used herein, a material is "radiation sensitive" if upon exposure to a given level of visible or other radiation the appearance of the material exposed changes to provide a contrast with material that was not exposed to that radiation. The image created thereby could thus be the result of a compositional change, a removal or ablation of the material, a phase change, or a polymerization of the radiation sensitive coating. Examples of some radiation sensitive metallic film materials include aluminum, silver, copper, gold, titanium, zinc, tin, chromium, vanadium, tantalum, and alloys of these metals. These metals typically provide a contrast due to the difference between the native color of the metal and a modified color of the metal after exposure to the radiation. The image, as noted above, may also be provided by ablation, or by the radiation heating the material until an image is provided by optical modification of the material. U.S. Pat. No. 4,743,526, for example, describes heating a metal alloy to provide a color change.

In addition to metallic alloys, metallic oxides and metallic suboxides can be used as a radiation sensitive medium. Materials in this class include oxide compounds formed from aluminum, iron, copper, tin and chromium. Non-metallic materials such as zinc sulfide, zinc selenide, silicon dioxide, indium tin oxide, zinc oxide, magnesium fluoride and silicon can also provide a color or contrast that is useful for this disclosure.

Multiple layers of thin film materials can also be used to provide unique radiation sensitive materials. These multilayer materials can be configured to provide a contrast change by the appearance or removal of a color or contrast agent. Exemplary constructions include optical stacks or tuned cavities that are designed to be imaged (by a change in color, for example) by specific wavelengths of radiation. One specific example is described in U.S. Pat. No. 3,801,183, which discloses the use of cryolite/zinc sulphide ($Na_3AlF_6$/ZnS) as a dielectric mirror. Another example is an optical stack composed of chromium/polymer (such as plasma polymerized butadiene)/silicon dioxide/aluminum where the thickness of the layers are in the ranges of 4 nm for chromium, between 20 nm and 60 nm for the polymer, between 20 nm and 60 nm for the silicon dioxide, and between 80 nm and 100 nm for the aluminum, and where the individual layer thicknesses are selected to provide specific color reflectivity in the visible spectrum. Thin film tuned cavities could be used with any of the single layer thin films previously discussed. For example, a tuned cavity with an approximately 4 nm thick layer of chromium and the silicon dioxide layer of between about 100 nm and 300 nm, with the thickness of the silicon dioxide layer being adjusted to provide a colored image in response to specific wavelengths of radiation. Another example is US Patent Publication No. 2008/0160185.

Radiation sensitive materials useful for use in this disclosure also include thermochromic materials. "Thermochromic" describes a material that changes color when exposed to a change in temperature. Examples of useful thermochromic materials are described in U.S. Pat. No. 4,424,990, and include copper carbonate, copper nitrate with thiourea, and copper carbonate with sulfur containing compounds such as thiols, thioethers, sulfoxides, and sulfones. Examples of other suitable thermochromic compounds are described in U.S. Pat. No. 4,121,011, including hydrated sulfates and nitrides of boron, aluminum, and bismuth, and the oxides and hydrated oxides of boron, iron, and phosphorus.

In some embodiments, the imagable layer is a laser charable layer or layers, in other embodiments, the imagable layer comprises a multi-layer film article that form images upon exposure to laser radiation.

Examples of laser charable layers include, for example, layers of materials such as polycarbonate that contain additives that absorb laser radiation. A variety of melt-extrudable laser absorbing additives are suitable, many are commercially available from a variety of sources. The additives may be organic, inorganic (in particular metal oxides), or a hybrid. They may also be dyes, pigments, nanoparticles or the like. Some infrared absorbing dyes include nickel-based, palladium-based, and platinum-based dyes available from Epolin under the trade name "EPOLIGHT". Both linear and non-linear absorbing additives may be suitable. The absorption of laser radiation by the additives causes localized heating and consequent charring to occur. Since the polycarbonate layer typically is transparent with a white background, the localized black char spots can form a black and white image.

A wide variety of multi-layer film articles that form images upon exposure to laser radiation are suitable. One embodiment for preparing color images is described in US Patent Publication No. 2011/0063392 and PCT Publication No. WO 2009/140088. This embodiment comprises a multi-layer construction wherein at least one layer comprises a thermally activatable composition, and is hereinafter referred to as a thermally activatable layer, and in which the thermally activatable composition comprises a non-linear light to heat converter composition and a color forming compound; and activating the at least one thermally activatable layer with a light source to form an image. The thermally activatable composition may optionally comprise a thermal acid generator and/or a fixing compound. In some embodiments, the light source comprises a focused laser. In other embodiments, the multi-layer construction comprises more than one thermally activatable layer. After exposing the multiple thermally activatable layers to the light source, an image, or portions of an image, forms on each of the thermally activatable layers, thus forming an image on the construction.

The image is formed by selectively activating one or more thermally activatable layers with a light source. Generally the light source is a collimated light source such as a laser. Laser light sources are particularly useful because they are able to provide localized activation, that is, selective activation of a voxel on a single layer within multiple layers. Particularly useful are lasers that are combined with focusing optics to focus the laser output to a specific location along the z axis.

It is desirable that a single laser be able to activate all of the thermally activatable layers. It is also desirable that all thermally activatable layers be activated in a single pass with that laser.

Localized activation, such as activation of a single voxel within a layer, aids in the formation of well-resolved images when the layers within a multi-layer construction form different colors upon activation.

Unlike other multi-layer systems in which each layer is responsive to a different laser wavelength, the multi-layer construction of this disclosure permits color image formation with a single laser. The selective activation is achieved through the use of focusing optics to focus the laser output to a specific location along the z axis. In some embodiments, the laser pulse duration is from 100 picoseconds to 1 microsecond.

Many lasers emit beams with a Gaussian profile, in which case the laser is said to be operating on the fundamental transverse mode, or "$TEM_{00}$ mode" of the laser's optical resonator. The Gaussian beam is a beam of electromagnetic radiation whose transverse electric field and intensity (irradiance) distributions are described by Gaussian functions. For a Gaussian beam, the spot size, w(z), is defined as the radius of the circle around the z axis when the intensity at the circle is $1/e^2$ to that of the center of the circle. When an incident laser beam is focused by a lens, the propagated laser beam spot size, w(z), will be at a minimum value $w_0$ at one place along the beam propagation axis, z, known as the beam waist.

For a beam of wavelength λ at a distance z along the beam from the beam waist, the variation of the spot size is given by equation 1:

$$w(z) = w_0 \sqrt{1 + \left(\frac{z}{z_0}\right)^2} \quad (1)$$

where the origin of the z-axis is defined, without loss of generality, to coincide with the beam waist, and where $z_0$ is called the Rayleigh range and is defined by equation 2:

$$z_0 = \frac{\pi w_0^2}{\lambda}. \quad (2)$$

At a distance from the beam waist equal to the Rayleigh range $z_0$, the width, w, of the beam is defined by equation 3:

$$w(\pm z_0) = w_0 \sqrt{2} \quad (3).$$

The distance between these two points (+$z_0$ and −$z_0$) is called the confocal parameter, b, or the depth of focus of the beam, and is 2 times the Rayleigh range $z_0$.

Another way to describe the laser focus is by the numerical aperture (usually abbreviated NA), which is the refractive index of the lens material, n, times the sine of the half angle, Θ, of the cone of the focus as shown in equation 4 below:

$$NA = n * \sin\frac{\Theta}{2} \approx \frac{D}{2f} \quad (4)$$

where f is the focal length of the focusing lens and D is the diameter of the lens or the diameter of the laser beam coming into the lens.

The spot size of the focused beam is determined by the numerical aperture defined in equation 4. If the beam incident on the lens has a constant transverse profile, i.e., a flat top beam, the focused spot has an intensity profile described by the Airy disc where the diameter ($2w_o$) of the first dark ring is given by equation 5 below:

$$2w_0 = 1.22 \frac{\lambda}{NA} \quad (5)$$

where λ is the laser wavelength. The focused spot size is inversely related to the NA. A comparison of equations 3 and 5, demonstrates that the depth focus of the beam, $2z_0$, is directly related to the laser wavelength and inversely related to the square of NA. The focal plane of a focused laser is therefore actually a three dimensional volume whose thickness is given by the depth of focus.

Alternatively the image can be formed by using multi-layer films to selectively pass or block polarized laser light, thereby either selectively activating thermally activatable layers as described in co-pending applications "Multi-layer Articles Capable of Forming Color Images and Methods of Forming Color Images" Ser. No. 61/360,032 filed Jun. 30, 2010 and "Multi-layer Articles Capable of Forming Color Images and Methods of Forming Color Images" Ser. No. 61/360,022 filed Jun. 30, 2010.

Other embodiments of a multi-layer film article involve a colored background layer and one or more layers or opaque film covering the background layer. In these embodiments, the image is formed by selectively exposing the background layer. The selective exposure can be made by etching away portions of the film as described in, for example, US Patent Publication No. 2008/0160185 or by changing the refractive index of portions of the film layer, changing the film from opaque to transparent as described in PCT Publication No. WO 2010/075373 (Merrill et al.).

In order to image the imagable layer with a laser, the laser radiation must be able to pass through the cover layer. If the portion of the imagable layer that is to be personalized is covered by a cover layer that has a microstructured surface, the microlenses or lenticular surface of the microstructured surface can interfere with the laser radiation and effectively block laser personalization. This function of the microstructured surface helps to prevent tampering with the security function of the article by preventing subsequent imaging of the imagable layer, but it also blocks the desired personalization as well.

In order to make the imagable layer laser writable, the microstructured surface is rendered invisible to a writing laser. By this it is meant that the microstructured surface has no intrinsic refraction, reflection, or absorbance at the laser wavelength. This is achieved through the use of an optically transparent, removable, conformable layer such as a processing tape as described below.

Besides the layers listed above the multi-layer security document may contain a variety of additional optional layers. The nature and purpose of the optional layers depends upon where these optional layers are located within the multi-layer security document. Optional layers that may be between the cover layer and the imagable layer are optically transparent. Layers that are laminated to the imagable layer on the side opposite to the cover layer may be transparent or opaque. For example, an opaque supporting layer may be laminated to the imagable layer on the side opposite to the cover layer to make the security document readable only from the cover layer side of the document. Additionally, a backing layer can be rigid to provide support to the multi-layer security document.

The laser-personalizable security articles of this disclosure also comprise an optically transparent, removable, conformable layer adhered to the microstructured surface of the cover layer. This optically transparent, removable, conformable layer is used to at least provide the optical function of rendering the microstructured surface of the cover layer invisible to a writing laser. The optically transparent, removable, conformable layer may be a transparent gel layer or a transparent elastomeric polymer layer, as long as the layer is able to wet the microstructured surface and render the cover layer invisible to a writing laser. In many embodiments, the optically transparent, removable, conformable layer is a processing tape.

Depending upon when in the preparation of the laser-personalizable security article the processing tape is applied to the cover layer, the processing tape may also provide other functions as well, such as protecting the microstructured surface during lamination and/or die cutting processes.

A wide range of processing tapes are suitable, the properties of which are dependent upon where in the process of preparing the laser-personalizable security article the tape is applied. A number of different embodiments of processing tape have been developed with the appropriate properties for its intended use.

In a first embodiment of the processing tape, the tape is designed to be applied after the multi-layer laser-personalizable security article has been prepared and die cut. This tape has optical properties as the primary properties required of the tape. The tape comprises an optically transparent backing, and an optically transparent pressure sensitive adhesive layer at least partially coated on the backing. The pressure sensitive adhesive should be able to sufficiently wet out on the microstructured surface to render the microstructured surface invisible to a writing laser, and be cleanly removable from the microstructured surface after laser personalization. Additionally, it is desirable that the pressure sensitive adhesive have a similar refractive index to the microstructured surface to aid in rendering the microstructured surface invisible to a writing laser. Typically the pressure sensitive adhesive has a refractive index in the range of 1.45-1.55. In some embodiments it is desirable that the pressure sensitive adhesive have a refractive index that is within 0.05 of the refractive index of the microstructured surface.

In a second embodiment of the processing tape, the tape is designed to be applied to a multi-layer laser personalizable security sheet prior to it being die cut to form the laser personalizable security article. This tape has the same optical properties and removability properties as the first embodiment, with the added desirable feature that the pressure sensitive adhesive not ooze upon die cutting.

The third embodiment of the processing tape is designed to be applied to microlens sheeting and remain adhered to the microstructured surface of the microlens sheeting throughout the preparation and die cutting of the security article. The demands on this tape are much more stringent as the tape has to be able to wet out the microstructured surface and yet survive without flowing the lamination steps used to prepare the multi-layer laser personalizable security sheet (which typically involve heat and pressure). Additionally, it cannot harden during these steps as it is a removable tape that is desirably removable without leaving a substantial amount of residue on the microstructured surface.

Embodiments of the third tape embodiment are described in co-pending application "Processing Tapes For Preparing Laminate Articles" Ser. No. 61/488,200 filed the same day as the present application.

In some embodiments, the tape is prepared by solvent coating methods. These tapes comprise a dimensionally stable transparent polymeric film with at least one treated surface, and a transparent pressure sensitive adhesive layer at least partially coated on the treated surface of the dimensionally stable transparent polymeric film. In some embodiments, the dimensionally stable polymeric film comprises a polycarbonate film. The pressure sensitive adhesive comprises a crosslinked (meth)acrylate-based polymer comprising 95-99.5% alkyl (meth)acrylate monomers and 0.5-5% acidic monomers, and the pressure sensitive adhesive has a refractive index in the range of 1.45-1.55. The treated surface may comprise a physically treated surface, such as a surface that has been corona treated or it may comprise a chemically treated surface such as a surface to which a primer is applied. In some embodiments the alkyl (meth)acrylate monomers comprise iso-octyl acrylate, 2-ethyl hexyl acrylate or a combination thereof and the crosslinker is present in amounts of 0.3-0.75% by weight.

In other embodiments, the tape is prepared by a coat and cure method. These tapes comprise a dimensionally stable transparent polymeric film, and a transparent pressure sensitive adhesive layer at least partially coated on the dimensionally stable transparent polymeric film. In some embodiments, the dimensionally stable polymeric film comprises a polycarbonate film. The pressure sensitive adhesive comprises a crosslinked (meth)acrylate-based polymer comprising 95-100% alkyl (meth)acrylate monomers and 0-5% acidic monomers, and the pressure sensitive adhesive has a refractive index in the range of 1.45-1.55. In some embodiments the alkyl (meth)acrylate monomers comprise iso-octyl acrylate, 2-ethyl hexyl acrylate, iso-bornyl acrylate or a combination thereof and the crosslinker is present in amounts of 0.3-1.0% by weight.

Also disclosed herein are methods of preparing laser-personalizable security articles. Just as a variety of different processing tapes can be used, a variety of different methods have been developed, depending upon at which point the processing tape is adhered to the microstructured surface of the cover layer. In some embodiments, the processing tape is applied to a "blank" security document prior to being laser-personalized. A blank security document is a multi-layer security article that contains the composite image and is ready to be laser-personalized. In other embodiments the processing tape is applied to a security document sheet prior to die cutting to form the blank security document. In still other embodiments, the processing tape is applied to the microstructured sheeting, and the processing tape remains in place as the blank security document is assembled, die cut, and laser-personalized. All of these methods have in common the initial step of laminating the processing tape to a microstructured surface to form a microstructured surface layer/processing tape laminate. In some embodiments the microstructured surface is part of an already prepared blank security document or security sheet, in other embodiments the microstructured surface is microstructured sheeting. When the microstructured surface is microstructured sheeting, additional processing steps to form the blank security document are performed, and a more robust processing tape is required to successfully navigate these processing steps. Each of these embodiments of the method to prepare a laser-personalizable security article are presented in greater detail below.

A first embodiment of the method to prepare a laser-personalizable security article comprises providing a layer at least partially covered with a microstructured surface; and laminating a processing tape to the microstructured surface of the layer to form a microstructured surface layer/processing tape laminate. The layer at least partially covered with a microstructured surface comprises a multi-layer security document, or blank security document as described above. The multi-layer security document comprises a transparent cover layer with a first surface, a second surface, and a thickness between the first surface and the second surface. The first surface is at least partially a microstructured surface, that forms microlenses or a lenticular surface. The multi-layer security document also comprises a composite image, wherein the composite image comprises a collection of complete or partial images located such that when viewed through the microstructured surface of the cover layer, the collection of complete or partial images forms the composite image. Additionally, the multi-layer security document comprises an imagable layer, wherein the imagable layer comprises a laser imagable layer. The microstructured surface, the composite image and the imagable layer have all been described above.

Typically, the collection of complete or partial images are located on or within the second surface of the cover layer and the cover layer thickness is such that the second surface of the cover layer is within the focal plane of the microlenses, which has a thickness described by equation 3 above. Generally, the collection of complete or partial images are printed or laser written as described for example in U.S. Pat. No. 6,288,842 (Florczak et al.) and US Patent Publication No. 2007/0081254 (Endle et al.). The color image may be a black and white image, but more typically is a color image.

A second embodiment of the method to prepare a laser-personalizable security article comprises providing a layer at least partially covered with a microstructured surface; and laminating a processing tape to the microstructured surface of the layer to form a microstructured surface layer/processing tape laminate. The layer at least partially covered with a microstructured surface comprises a multi-layer security document sheet. The multi-layer security document sheet comprises a die-cuttable sheet, that upon die cutting forms multi-layer security documents. The die-cuttable sheet comprises a transparent cover layer with a first surface, a second surface, and a thickness between the first surface and the second surface. The first surface is at least partially a microstructured surface, that forms microlenses or a lenticular surface. The multi-layer security document also comprises a composite image, wherein the composite image comprises a collection of complete or partial images located such that when viewed through the microstructured surface of the cover layer, the collection of complete or partial images forms the composite image. Additionally, the multi-layer security document comprises an imagable layer, wherein the imagable layer comprises a laser imagable layer. The microstructured surface, the composite image and the imagable layer have all been described above.

Typically, the collection of complete or partial images are located on or within the second surface of the cover layer and the cover layer thickness is such that the second surface of the cover layer is within the focal plane of the microlenses, which has a thickness described by equation 3 above. Generally, the collection of complete or partial images are printed or laser written as described for example in U.S. Pat. No. 6,288,842 (Florczak et al.) and US Patent Publication No. 2007/0081254 (Endle et al.). The color image may be a black and white image, but more typically is a color image.

Laser-personalizable security articles are generated by die cutting the die-cuttable sheet.

A third embodiment of the method to prepare a laser-personalizable security article comprises providing a layer at least partially covered with a microstructured surface; and laminating a processing tape to the microstructured surface of the layer to form a microstructured surface layer/processing tape laminate. The layer at least partially covered with a microstructured surface comprises microlens sheeting. The microlens sheeting comprises a transparent cover layer sheet with a first surface, a second surface, and a thickness between the first surface and the second surface. The first surface is at least partially covered with a microstructured surface forming microlenses or a lenticular surface. The cover layer sheet also comprises a composite image, wherein the composite image comprises a collection of complete or partial images located such that when viewed through the microstructured surface of the cover layer, the collection of complete or partial images forms the composite image.

The method further comprises laminating the microstructured surface layer/processing tape laminate to a substrate by heat lamination to form a security sheet, and die cutting the security sheet to form a laser-personalizable security article. The heat lamination is carried out under conditions of elevated temperature and pressure. For example, in some embodiments a polycarbonate card of six layers can be laminated under a heating cycle of 180° C. and 100 Newtons per square centimeter (N/cm$^2$) for 20 minutes followed by a cooling cycle to room temperature with a pressure of 150 N/cm$^2$ for 20 minutes. The substrate comprises an imagable layer, wherein the imagable layer is laser imagable. The microstructured surface, the composite image and the imagable layer have all been described above.

Typically, the collection of complete or partial images are located on or within the second surface of the cover layer and the cover layer thickness is such that the second surface of the cover layer is within the focal plane of the microlenses, which has a thickness described by equation 3 above. Generally, the collection of complete or partial images are printed or laser written as described for example in U.S. Pat. No. 6,288,842 (Florczak et al.) and US Patent Publication No. 2007/0081254 (Endle et al.). The color image may be a black and white image, but more typically is a color image.

Figure 3:
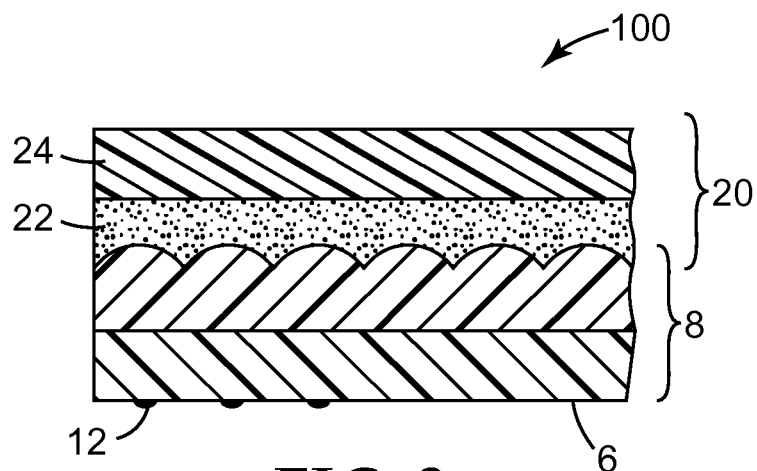
FIG. 3 is an enlarged cross sectional view of microlens sheeting containing a composite image and laminated to a processing tape.
Figure 4:
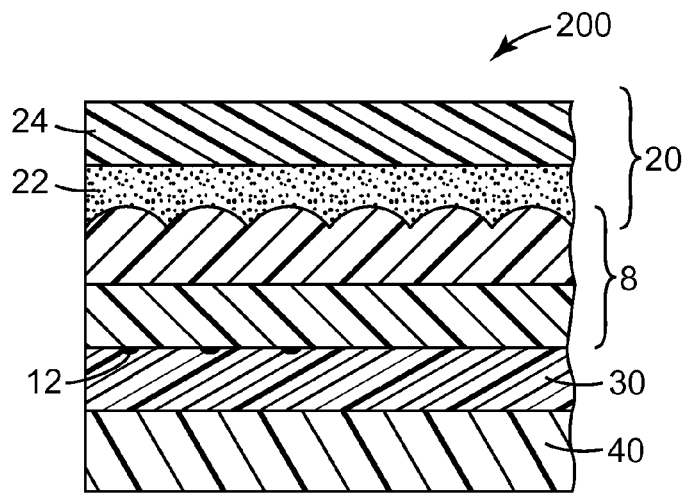
FIG. 4 is an enlarged cross sectional view of an embodiment of a laser-personalizable security article of the present disclosure.

The third embodiment of the method is further illustrated in FIGS. 3 and 4. In FIG. 3, article 100 is shown which comprises microlens sheeting 8 and processing tape 20 laminated to the microstructured surface of microlens sheeting 8. Microlens sheeting 8 can be the microlens sheeting of either FIG. 1 or FIG. 2, and may contain optional layer 14. A composite image 12 is present on a portion of the second surface 6 of microlens sheeting 8. Composite image 12 is merely descriptive, is not to scale, and is not designated to show alignment with the microlenses through which the image is viewed. The processing tape 20 comprises pressure sensitive adhesive layer 22 and dimensionally stable backing 24.

FIG. 4, shows article 200, which is prepared by laminating article 100 of FIG. 3 to a substrate comprising at least imagable layer 30 and optional layer or layers 40. The remaining elements of FIG. 4: microlens sheeting 8; processing tape 20 comprising pressure sensitive adhesive layer 22 and dimensionally stable backing 24; and composite image 12 are all as described above.

Also disclosed herein are personalized security documents. These personalized security documents are prepared by personalized laser imaging of the personalizable security articles described above, and removing the processing tape or other optically transparent, removable, conformable layer. The removal of the processing tape or other optically transparent, removable, conformable layer may be done by hand or through the use of mechanical devices such as, for example, a collection tool. Examples of collection tools include clips or other similar devices that are attached to the processing tape or other optically transparent, removable, conformable layer and mechanically peel away the processing tape or other optically transparent, removable, conformable layer. The collection tool may include a winding tool to wind up the removed processing tape or other optically transparent, removable, conformable layer.

Figure 5:
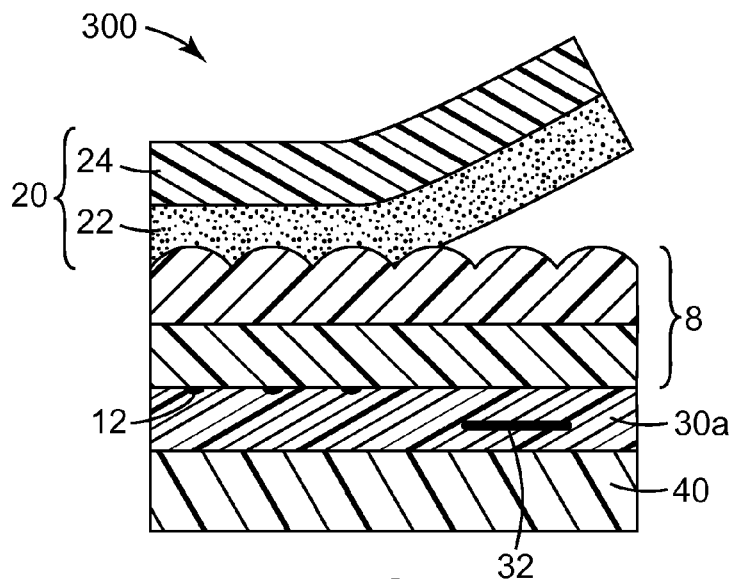
FIG. 5 is an enlarged cross sectional view of an embodiment of a laser-personalized security article of the present disclosure.

An embodiment of a laser personalized security article of this disclosure is illustrated in FIG. 5. In this figure, the laser-personalized article 300 is the laser-personalizable article of FIG. 4 that has been laser-personalized and the processing tape is being removed. Article 300 comprises microlens sheeting 8, with composite image 12, laminated to imaged layer 30a (imaged layer 30a results from the imaging of imagable layer 30) with personalized image 32. Processing tape 20, comprising pressure sensitive adhesive layer 22 and dimensionally stable backing 24 is being removed from the microstructured surface of microlens sheeting 8.

The personalized multi-layer security documents comprise a transparent cover layer, a composite image, and an imaged layer comprising at least one personalized image. The transparent cover layer has a first surface, a second surface, and a thickness between the first surface and the second surface. The first surface is at least partially a microstructured surface, wherein the microstructured surface forms microlenses or a lenticular surface. The composite image is a collection of complete or partial images located such that when viewed through the microstructured surface of the cover layer, the collection of complete or partial images forms the composite image. The imaged layer is located adjacent to the cover layer and typically comprises at least one laser imaged two dimensional image.

The composite image typically is located on or within the second surface of the cover layer and the cover layer thickness is such that the second surface of the cover layer is within the focal plane of the microlenses, which has a thickness described by equation 3 above. Composite images have been described in detail above.

The personalized multi-layer security document may contain additional optional layers such as, for example, an additional transparent layer between the cover layer and the imaged layer. However, the personalized multi-layer security document does not contain any adhesive layers between the cover layer and the imaged layer.

Figure 6:
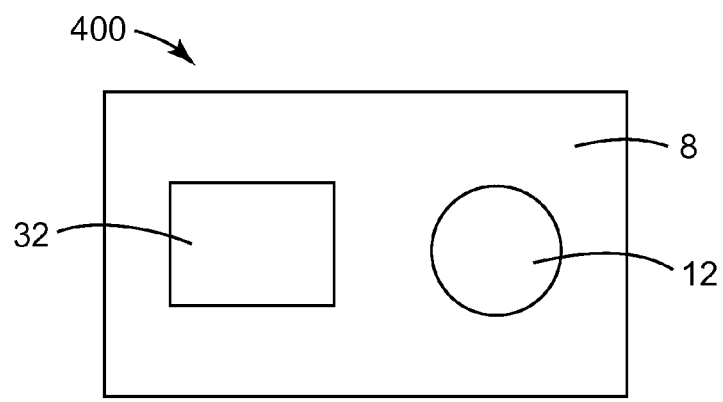
FIG. 6 is a top view of an embodiment of a laser-personalized security article of the present disclosure.

FIG. 6 shows a top view of an embodiment of a laser-personalized security article of this disclosure. FIG. 6 shows laser-personalized article 400, which is a top view of the laser-personalized security article 300 of FIG. 5 in which the processing tape 20 has been removed. Article 400 shows the top surface of microlens sheeting 8, composite image 12 and laser-personalized image 32. Laser personalized image 32 may comprise a series of images and/or personal information.

The present disclosure includes the following embodiments.

Among the embodiments are laser-personalizable security articles. A first embodiment includes a laser-personalizable security article comprising: a multi-layer security document, the multi-layer security document comprising: an optically transparent cover layer with a first surface, a second surface, and a thickness between the first surface and the second surface, the first surface being at least partially a microstructured surface, wherein the microstructured surface forms microlenses or a lenticular surface; a composite image, wherein the composite image comprises a collection of complete or partial images located such that when viewed through the microstructured surface of the cover layer, the collection of complete or partial images forms the composite image; and an imagable layer adjacent to the cover layer, wherein the imagable layer comprises a laser imagable layer; and an optically transparent, removable, conformable layer, wherein the removable, conformable layer sufficiently wets out on the microstructured surface to render the microstructured surface invisible to a writing laser.

Embodiment 2 is the laser-personalizable security article of embodiment 1, wherein the optically transparent, removable, conformable layer comprises a processing tape wherein the tape comprises: an optically transparent backing; and an optically transparent pressure sensitive adhesive layer at least partially coated on the backing, wherein the pressure sensitive adhesive is sufficiently wet out on the microstructured surface to render the microstructured surface invisible to a writing laser.

Embodiment 3 is the laser-personalizable security article of embodiment 1 or 2, wherein the collection of complete or partial images are located on or within the second surface of the cover layer.

Embodiment 4 is the laser-personalizable security article of any of embodiments 1-3, wherein the microstructured surface comprises microlenses, and the cover layer thickness is such that the second surface of the cover layer is within the focal plane of the microlenses.

Embodiment 5 is the laser-personalizable security article of any of embodiments 1-4, wherein the collection of complete or partial images are printed or laser written.

Embodiment 6 is the laser-personalizable security article of any of embodiments 1-5, wherein the composite image comprises a color image.

Embodiment 7 is the laser-personalizable security article of any of embodiments 1-6, wherein the cover layer comprises a multi-layer construction comprising a cover film and a spacing layer.

Embodiment 8 is the laser-personalizable security article of any of embodiments 1-7, wherein the imagable layer comprises a radiation sensitive layer.

Embodiment 9 is the laser-personalizable security article of any of embodiments 1-8, wherein the imagable layer comprises a laser charable layer, a laser writable multi-layer film article, or combination thereof.

Embodiment 10 is the laser-personalizable security article of any of embodiments 2-9, wherein the processing tape pressure sensitive adhesive has a refractive index in the range 1.45-1.55.

Embodiment 11 is the laser-personalizable security article of any of embodiments 1-10, wherein the security document comprises additional layers.

Embodiment 12 is the laser-personalizable security article of any of embodiments 1-11, further comprising at least one additional transparent layer between the cover layer and the imagable layer.

Embodiment 13 is the laser-personalizable security article of any of embodiments 2-12, wherein the processing tape comprises a dimensionally stable backing, and the pressure sensitive adhesive comprises a crosslinked (meth)acrylate-based polymer comprising 95-100% alkyl (meth)acrylate monomers and 0-5% acidic monomers and 0.3-1.0% by weight crosslinker.

Embodiment 14 is the laser-personalizable security article of any of embodiments 2-12, wherein the processing tape comprises a dimensionally stable backing, and the pressure sensitive adhesive comprises a crosslinked (meth)acrylate-based polymer comprising 95-99.5% alkyl (meth)acrylate monomers and 0.5-5% acidic monomers and 0.3-0.75% by weight crosslinker.

Among the embodiments are laser-personalized security articles. Embodiment 15 includes a laser-personalized multi-layer security article comprising: an optically transparent cover layer with a first surface, a second surface, and a thickness between the first surface and the second surface, the first surface being at least partially a microstructured surface, wherein the microstructured surface forms microlenses or a lenticular surface; a composite image, wherein the composite image comprises a collection of complete or partial images located such that when viewed through the microstructured surface of the cover layer, the collection of complete or partial images forms the composite image; and an imaged layer located adjacent to the second surface of the cover layer, wherein the imaged layer comprises at least one laser imaged two dimensional image, and wherein there are no adhesive layers between the cover layer and the imaged layer.

Embodiment 16 is the laser-personalized security article of embodiment 15, wherein the image or collection of partial images are located on or within the second surface of the cover layer.

Embodiment 17 is the laser-personalized security article of embodiment 15 or 16, wherein the microstructured surface comprises microlenses, and the cover layer thickness is such that the second surface of the cover layer is within the focal plane of the microlenses.

Embodiment 18 is the laser-personalized security article of any of embodiments 15-17, wherein the collection of complete or partial images are printed or laser written.

Embodiment 19 is the laser-personalized security article of any of embodiments 15-18, wherein the composite image comprises a color image.

Embodiment 20 is the laser-personalized security article of any of embodiments 15-19, wherein the security document comprises additional layers.

Embodiment 21 is the laser-personalized security article of any of embodiments 15-20, further comprising at least one additional transparent layer between the cover layer and the imaged layer.

Among the embodiments are methods of preparing laser-personalizable security articles. Embodiment 22 includes a method of preparing a laser-personalizable security article comprising: providing a layer at least partially covered with a microstructured surface; and laminating a processing tape to the microstructured surface of the layer to form a microstructured surface layer/processing tape laminate, the processing tape comprising: an optically transparent backing; and an optically transparent pressure sensitive adhesive layer at least partially coated on the backing, wherein the pressure sensitive adhesive layer sufficiently wets out on the microstructured surface to render the microstructured surface invisible to a writing laser.

Embodiment 23 is the method of embodiment 22, wherein the layer at least partially covered with a microstructured surface comprises a multi-layer security document, the multi-layer security document comprising: an optically transparent cover layer with a first surface, a second surface, and a thickness between the first surface and the second surface, the first surface being at least partially a microstructured surface, wherein the microstructured surface forms microlenses or a lenticular surface; a composite image, wherein the composite image comprises a collection of complete or partial images located such that when viewed through the microstructured surface of the cover layer, the collection of complete or partial images forms the composite image; and an imagable layer, wherein the imagable layer comprises a laser imagable layer.

Embodiment 24 is the method of embodiment 22 or 23, wherein the collection of complete or partial images are located on or within the second surface of the cover layer.

Embodiment 25 is the method of any of embodiments 22-24, wherein the microstructured surface comprises microlenses, and the cover layer thickness is such that the second surface of the cover layer is within the focal plane of the microlenses.

Embodiment 26 is the method of any of embodiments 22-25, wherein the collection of complete or partial images are printed or laser written.

Embodiment 27 is the method of any of embodiments 22-26, wherein the composite image comprises a color image.

Embodiment 28 is the method of embodiment 22, wherein the multi-layer security document comprises a die-cuttable sheet.

Embodiment 29 is the method of embodiment 28, further comprising die cutting the laminated die-cuttable sheet to form laser-personalizable security articles.

Embodiment 30 is the method of embodiment 22, wherein the layer at least partially covered with a microstructured surface comprises: an optically transparent cover layer sheet with a first surface, a second surface, and a thickness between the first surface and the second surface, the first surface being at least partially covered with a microstructured surface forming microlenses or a lenticular surface; and a composite image, wherein the composite image comprises a collection of complete or partial images located such that when viewed through the microstructured surface of the cover layer sheet, the collection of complete or partial images forms the composite image; laminating the microstructured surface layer/processing tape laminate to a substrate at an elevated temperature and pressure to form a security sheet, wherein the substrate comprises an imagable layer, wherein the imagable layer is laser imagable; and die cutting the security sheet to form a laser-personalizable security article.

Embodiment 31 is the method of embodiment 30, wherein the collection of complete or partial images are located on or within the second surface of the cover layer.

Embodiment 32 is the method of embodiment 30 or 31, wherein the microstructured surface comprises microlenses, and the cover layer thickness is such that the second surface of the cover layer is within the focal plane of the microlenses.

Embodiment 33 is the method of any of embodiments 30-32, wherein the collection of complete or partial images are printed or laser written.

Embodiment 34 is the method of any of embodiments 30-33, wherein the composite image comprises a color image.

Embodiment 35 is the method of any of embodiments 30-34, wherein the substrate comprises a multi-layer substrate, wherein at least one layer comprises an imagable layer.

Embodiment 36 is the method of any of embodiments 30-35, wherein the processing tape pressure sensitive adhesive has a refractive index in the range 1.45-1.55.

Embodiment 37 is the method of any of embodiments 30-36, wherein the processing tape comprises a dimensionally stable backing, and the pressure sensitive adhesive comprises a crosslinked (meth)acrylate-based polymer comprising 95-100% alkyl (meth)acrylate monomers and 0-5% acidic monomers and 0.3-1.0% by weight crosslinker.

Embodiment 38 is the method of any of embodiments 30-36, wherein the processing tape comprises a dimensionally stable backing, and the pressure sensitive adhesive comprises a crosslinked (meth)acrylate-based polymer comprising 95-99.5% alkyl (meth)acrylate monomers and 0.5-5% acidic monomers and 0.3-0.75% by weight crosslinker.

Embodiment 39 is the laser-personalizable security article of any of embodiments 1-14, wherein the microstructured surface comprises a coating layer, the coating layer comprising the cured reaction mixture comprising: i) a majority of at least one multifunctional (meth)acrylate monomer; ii) at least one perfluoropolyether additive having a perfluoropolyether moiety and at least one free radically reactive group; iii) surface treated nanoparticles; and iv) an initiator.

Embodiment 40 is the laser-personalizable security article of embodiment 39, wherein the perfluoropolyether additive comprises a perfluoropolyether urethane additive.

Embodiment 41 is the laser-personalizable security article of embodiments 39 or 40, wherein the cured reaction mixture further comprises a free radically polymerizable monomer that is fluorocarbon-based or siloxane-based.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

Table of Abbreviations

| Abbreviation or Nickname | Description |
|---|---|
| PSA-1 | A pressure sensitive adhesive polymer composition with a monomer ratio of 98/2 IOA/AA dissolved in MEK at 26% solids, prepared as described in U.S. Pat. No. 7,385,020, Example 1. |
| PSA-2 | A silicone gel commercially available from Dow Corning, Midland, MI as "7-9850". |
| Acrylate Resin | A curable acrylate resin containing. 30 weight % "SR601" commercially available from Sartomer, Exton, PA; 30 weight % HDDA; 40 weight % "SR399" commercially available from Sartomer, Exton, PA; 1 weight % "TPO" commercially available from BASF, Florham Park, NJ; and 0.5 weight % initiator "TINUVIN 405" commercially available from CIBA, Hawthorne, NY. |
| MEK | Methyl ethyl ketone |
| IOA | Iso-octyl acrylate |
| AA | Acrylic acid |
| Crosslinker | Aziridine crosslinker, 1,1'-isophthaloylbis(2-methylaziridine), CAS 7652-64-4. |
| PC Backing | A 3 mil (75 micrometer) thick 3M Clear Polycarbonate Security Film commercially available from 3M Company, St. Paul, MN. |
| Primer | A water-based primer prepared as described in Step 1 of Synthesis Example 1 below. |
| Silica Nanoparticles-1 | A dispersion of silica nanoparticles in water (14.5% solids) commercially available as NALCO 2326 commercially available from Nalco Company, Naperville, IL. |
| APS | 3-aminopropyltriethoxysilane, commercially available from OSi Specialties, Danbury, CT as "SILQUEST A-1100". |
| Surfactant | Nonionic surfactant X-100. |
| Release Liner | Release liner commercially available from CP Film, Martinsville, VA as "T50". |
| HDDA | Hexanediol di-acrylate |
| Silica Nanoparticles-2 | A dispersion of silica nanoparticles in water (40% solids) commercially available as NALCO 2329K commercially available from Nalco Company, Naperville, IL. |
| STA-1 | Surface Treatment Agent-1, commercially available from OSi Specialties, Danbury, CT as "SILQUEST A-174". |
| UA-1 | A hexafunctional aliphatic urethane acrylate commercially available from Cytec Industrials Inc., Smyrna, GA as "EBECRYL 8301". |
| HFPO UA | HFPO-Urethane Acrylate solution (30 wt % in MEK) was prepared according to U.S. patent Publication No. 2011/0086221 (HFPO Urethane 1). |
| HFPO | As used in the examples, unless otherwise noted, refers to the end group $F(CF(CF_3)CF_2O)aCF(CF_3)$— of the methyl ester $F(CF(CF_3)CF_2O)aCF(CF_3)C(O)OCH_2$, ($HFPO-C(O)CH_3$), wherein a averages abut 6.84, with an average molecular weight of 1314 g/mol. It was prepared according to the method reported in U.S. Pat. No. 3,250,808 (Moore et al.), with purification by fractional distillation. |
| Photoinitiator | Photoinitiator IRGACURE 184 commercially available from CIBA, Hawthorne, NY. |

Synthesis Example SE1

Preparation of Processing Tape

A processing tape was prepared by the steps described below.

Step 1: Preparation of Primer:

A water-borne primer was prepared by mixing together de-ionized water (436.75 grams), Silica Nanoparticles-1 (61.39 grams), APS (0.801 gram), Surfactant (1.20 grams), and 29% ammonium hydroxide (0.9648 gram).

Step 2: Preparation of Treated PC Backing:

A sample of PC Backing was surface treated by air corona treatment (0.75 Joules/cm$^2$ in air) and application of Primer prepared in Step 1. The Primer was applied using a #3 Meyer Rod to give a nominal wet thickness of 100 nanometers. The PC Backing was then dried in a 110° C. oven for 30 minutes.

Step 3: Preparation of Pressure Sensitive Adhesive Layer:

A solvent-borne pressure sensitive adhesive composition was prepared by mixing together PSA-1 and 0.5% by dry weight Crosslinker. The solvent-borne pressure sensitive adhesive composition was coated on Release Liner using a knife coater to give a wet thickness of 6 mils (152 micrometers), and then dried in a 120° C. oven for 15 minutes to give a dry thickness of approximately 0.9-1.1 mils (23-28 micrometers) to form an adhesive layer.

Step 4: Lamination to Form Tape:

A tape sample was made by laminating the treated PC Backing to the adhesive layer coated on a release liner.

Example 1

A microlens film sheet was produced by micro-replication of an array of tightly packed lenses with Acrylate Resin onto a roll of 100 micrometers (4 mils) thick 3M Clear Polycarbonate Security Film (3M Company, St. Paul, Minn.). The resulting lens film was approximately 123 micrometers thick. The replicated lenses had a 37.0 micrometer radius of curvature and a negative 0.931 conic constant. The diameter of each lens formed at the surface of the acrylate was 86 micrometers, with a center-to-center lens distance of 74 micrometers. The microlens film sheet was then imaged with color floating/sinking images to form the imaged lens film "A", following the process as that described in US Patent Publication 2007/0081254.

The processing tape prepared in Synthesis Example SE1 was laminated to the microstructured surface of the microlens film sheet to form cover film "B".

The cover film "B" was sheeted to 15.2 centimeter×15.2 centimeter (6 inch×6 inch) square sheets and stacked with the color floating/sinking image side down to other sheets of the same size to form the seven layer stack shown in Table 1 below.

TABLE 1

| Layer | Description |
|---|---|
| 1 | Cover Layer "B" |
| 2 | 100 micrometer thick 3M Laser Engravable Polycarbonate Security Film (3M Company, St. Paul, MN) |
| 3 | 100 micrometer thick 3M White Polycarbonate Security Film (3M Company, St. Paul, MN) |
| 4 | 100 micrometer thick 3M White Polycarbonate Security Film (3M Company, St. Paul, MN) |
| 5 | 100 micrometer thick 3M White Polycarbonate Security Film (3M Company, St. Paul, MN) |
| 6 | 100 micrometer thick 3M Laser Engravable Polycarbonate Security Film (3M Company, St. Paul, MN) |
| 7 | 50 micrometer thick 3M Clear Polycarbonate Security Film (3M Company, St. Paul, MN) |

The stack of films described by Table 1 was laminated with heat and pressure using a Carver press under typical polycarbonate card lamination conditions. These conditions are: heating the stack under 166° C. (330° F.), and 758 kiloPascals (110 psi) for 15 minutes, followed by cooling to room temperature under 758 kiloPascals (110 psi). Sample polycarbonate cards in the dimension of 8.56 centimeters×5.40 centimeters (3.370 inches×2.125 inches) were punched out from the laminated stack.

The sample polycarbonate cards were laser engraved with a portrait at 300 dots per inch (118 dots per centimeter) resolution by a MECCOMARK Fiber Laser Marking System equipped with a 20W fiber laser. The processing tape was then removed by hand peel.

The following criteria were noted and recorded for this process. The first criterion is "Card Quality". For this criterion, it was noted whether the tape was able to withstand the lamination process without warping or other defect. If the Card Quality was acceptable the sample was listed as "Pass". The second criterion is "Tape Removal By Peel". For this criterion, the difficulty of peeling the tape away from the microstructured surface was characterized by the "tightness" of the adhesive bond. A difficulty of peel such that the tape cannot be removed would be listed as "Fail", otherwise a general description of the tightness is listed. Additionally, the amount of adhesive residue left behind on the microstructured surface was described as the level of "cleanness" of the removal. "Clean removal" indicated that no residue was left, otherwise a percentage of adhesive removed (for example "98% removal" indicates that 98% of the microstructured surface is free of residue). The final criterion is "2 Dimensional Laser Image Formation". In this criterion, the quality of the 2 dimensional laser image engraved through the processing tape is described. "Good" indicated a good image was formed, "Poor", "Blurry", or "Too Dark" indicated a poor, blurry, or too dark of an image were formed. The results are summarized in Table 3.

Comparative Example C1

A microlens film sheet was produced by micro-replication of an array of tightly packed lenses with Acrylate Resin onto a roll of 100 micrometers (4 mils) thick 3M Clear Polycarbonate Security Film (3M Company, St. Paul, Minn.). The resulting lens film was approximately 123 micrometers thick. The replicated lenses had a 37.0 micrometer radius of curvature and a negative 0.931 conic constant. The diameter of each lens formed at the surface of the acrylate was 86 micrometers, with a center-to-center lens distance of 74 micrometers. The microlens film sheet was then imaged with color floating/sinking images to form the imaged lens film "A", following the process as that described in US Patent Publication 2007/0081254.

The cover film "A" was sheeted to 15.2 centimeter×15.2 centimeter (6 inch×6 inch) square sheets and stacked with the color floating/sinking image side down to other sheets of the same size to form the seven layer stack shown in Table 2 below.

TABLE 2

| Layer | Description |
|---|---|
| 1 | Cover Layer "A" |
| 2 | 100 micrometer thick 3M Laser Engravable Polycarbonate Security Film (3M Company, St. Paul, MN) |

TABLE 2-continued

| Layer | Description |
|---|---|
| 3 | 100 micrometer thick 3M White Polycarbonate Security Film (3M Company, St. Paul, MN) |
| 4 | 100 micrometer thick 3M White Polycarbonate Security Film (3M Company, St. Paul, MN) |
| 5 | 100 micrometer thick 3M White Polycarbonate Security Film (3M Company, St. Paul, MN) |
| 6 | 100 micrometer thick 3M Laser Engravable Polycarbonate Security Film (3M Company, St. Paul, MN) |
| 7 | 50 micrometer thick 3M Clear Polycarbonate Security Film (3M Company, St. Paul, MN) |

The stack of films described by Table 2 was laminated with heat and pressure using a Carver press under typical polycarbonate card lamination conditions. These conditions are: heating the stack under 166° C. (330° F.), and 758 kiloPascals (110 psi) for 15 minutes, followed by cooling to room temperature under 758 kiloPascals (110 psi). Sample polycarbonate cards in the dimension of 8.56 centimeters×5.40 centimeters (3.370 inches×2.125 inches) were punched out from the laminated stack.

The sample polycarbonate cards were laser engraved with a portrait at 300 dots per inch (118 dots per centimeter) resolution by a MECCOMARK Fiber Laser Marking System equipped with a 20W fiber laser.

The following criteria were noted and recorded for this process. The first criterion is "Card Quality". For this criterion, it was noted whether the tape was able to withstand the lamination process without warping or other defect. If the Card Quality was acceptable the sample was listed as "Pass". The second criterion is "Tape Removal By Peel". For this criterion, the difficulty of peeling the tape away from the microstructured surface was characterized by the "tightness" of the adhesive bond. A difficulty of peel such that the tape cannot be removed would be listed as "Fail", otherwise a general description of the tightness is listed. Additionally, the amount of adhesive residue left behind on the microstructured surface was described as the level of "cleanness" of the removal. "Clean removal" indicated that no residue was left, otherwise a percentage of adhesive removed (for example "98% removal" indicates that 98% of the microstructured surface is free of residue). The final criterion is "2 Dimensional Laser Image Formation". In this criterion, the quality of the 2 dimensional laser image engraved through the processing tape is described. "Good" indicated a good image was formed, "Poor", "Blurry", or "Too Dark" indicated a poor, blurry, or too dark of an image were formed. The results are summarized in Table 3.

TABLE 3

| Example | Card Quality | Tape Removal By Peel | 2 Dimensional Laser Image Formation |
|---|---|---|---|
| 1 | Pass | Somewhat tight Peel, 95% clean removal | Good |
| C1 | Pass | NA | Disfigured, Extremely Dark, Bubbles |

NA = Not Applicable

Example 2

A microlens film sheet was produced by micro-replication of an array of tightly packed lenses with Acrylate Resin onto a roll of 100 micrometers (4 mils) thick 3M Clear Polycarbonate Security Film (3M Company, St. Paul, Minn.). The resulting lens film was approximately 123 micrometers thick. The replicated lenses had a 37.0 micrometer radius of curvature and a negative 0.931 conic constant. The diameter of each lens formed at the surface of the acrylate was 86 micrometers, with a center-to-center lens distance of 74 micrometers. The microlens film sheet was then imaged with color floating/sinking images to form the imaged lens film "A", following the process as that described in US Patent Publication 2007/0081254.

The processing tape prepared in Synthesis Example SE1 was laminated to the microstructured surface of the microlens film sheet to form cover film "B".

Preparation of Color Shifting Film:

A roll of color-shifting opaque film was produced by building, in step-wise fashion, an eight layer thin film stack on top of a roll of 75 micrometers (3 mils) thick 3M Clear Polycarbonate Security Film (3M Company, St. Paul, Minn.). Layer 1 was sputtered titanium (about 2.5 nm), deposited onto the smooth side of the polycarbonate substrate. This layer is intended to serve as a substrate adhesion layer for layer 2, silver, also sputtered to a thickness of about 90 nm. The following layers, 3 through 8, are three sequential pairs of (a) polymer and (b) titanium, such as described in US Patent Publication No. 2008/0160185. The polymer layers were each about 210 nm thick and the titanium layers were each about 2.5 nm thick. When viewed from the coating side of the polycarbonate substrate, the color appearance produced by this coating stack appeared to be red near normal incidence and shifts to green at off-normal viewing angles. The color-shifting opaque film was converted to a rectangle patch of 30 mm×10 mm for incorporation into a stack of polycarbonate sheets as described below.

The cover film "B" was sheeted to 15.2 centimeter×15.2 centimeter (6 inch×6 inch) square sheets and stacked with the color floating/sinking image side down to other sheets of the same size to form the seven layer stack shown in Table 4 below, with the patch of color shifting film placed between the cover layer "B" and the rest of the stack.

TABLE 4

| Layer | Description |
|---|---|
| 1 | Cover Layer "B" |
| Patch | Color Shifting Film |
| 2 | 100 micrometer thick 3M Laser Engravable Polycarbonate Security Film (3M Company, St. Paul, MN) |
| 3 | 100 micrometer thick 3M White Polycarbonate Security Film (3M Company, St. Paul, MN) |
| 4 | 100 micrometer thick 3M White Polycarbonate Security Film (3M Company, St. Paul, MN) |
| 5 | 100 micrometer thick 3M White Polycarbonate Security Film (3M Company, St. Paul, MN) |
| 6 | 100 micrometer thick 3M Laser Engravable Polycarbonate Security Film (3M Company, St. Paul, MN) |
| 7 | 50 micrometer thick 3M Clear Polycarbonate Security Film (3M Company, St. Paul, MN) |

The stack of films described by Table 4 was laminated with heat and pressure using a Carver press under typical polycarbonate card lamination conditions. These conditions are: heating the stack under 166° C. (330° F.), and 758 kiloPascals (110 psi) for 15 minutes, followed by cooling to room temperature under 758 kiloPascals (110 psi). Sample polycarbonate cards in the dimension of 8.56 centimeters×5.40 centimeters (3.370 inches×2.125 inches) were punched out from the laminated stack.

The patch of the color shifting film in the sample polycarbonate cards was laser engraved with a signature image at 300 dots per inch (118 dots per centimeter) resolution by a MEC-COMARK Fiber Laser Marking System equipped with a 20W fiber laser. The processing tape was then removed by hand peel.

The following criteria were noted and recorded for this process. The first criterion is "Card Quality". For this criterion, it was noted whether the tape was able to withstand the lamination process without warping or other defect. The Card Quality was acceptable (the sample was listed as "Pass"). The second criterion is "Tape Removal By Peel". For this criterion, the difficulty of peeling the tape away from the microstructured surface was characterized by the "tightness" of the adhesive bond. The Tape Removal By Peel criterion was acceptable, much as for Example 1. The final criterion is "2 Dimensional Laser Image Formation". In this criterion, the quality of the 2 dimensional laser image on the patch of color shifting film engraved through the processing tape is described. The personalized signature image was a good silvery image on the color shifting opaque patch.

Example 3

A microlens film sheet was produced by micro-replication of an array of tightly packed lenses with Acrylate Resin onto a roll of 100 micrometers (4 mils) thick 3M Clear Polycarbonate Security Film (3M Company, St. Paul, Minn.). The resulting lens film was approximately 123 micrometers thick. The replicated lenses had a 37.0 micrometer radius of curvature and a negative 0.931 conic constant. The diameter of each lens formed at the surface of the acrylate was 86 micrometers, with a center-to-center lens distance of 74 micrometers. The microlens film sheet was then imaged with color floating/sinking images to form the imaged lens film "A", following the process as that described in US Patent Publication 2007/0081254.

The cover film "A" was sheeted to 15.2 centimeter×15.2 centimeter (6 inch×6 inch) square sheets and stacked with the color floating/sinking image side down to other sheets of the same size to form the seven layer stack shown in Table 5 below.

TABLE 5

| Layer | Description |
|---|---|
| 1 | Cover Layer "A" |
| 2 | 100 micrometer thick 3M Laser Engravable Polycarbonate Security Film (3M Company, St. Paul, MN) |
| 3 | 100 micrometer thick 3M White Polycarbonate Security Film (3M Company, St. Paul, MN) |
| 4 | 100 micrometer thick 3M White Polycarbonate Security Film (3M Company, St. Paul, MN) |
| 5 | 100 micrometer thick 3M White Polycarbonate Security Film (3M Company, St. Paul, MN) |
| 6 | 100 micrometer thick 3M Laser Engravable Polycarbonate Security Film (3M Company, St. Paul, MN) |
| 7 | 50 micrometer thick 3M Clear Polycarbonate Security Film (3M Company, St. Paul, MN) |

The stack of films described by Table 5 was laminated with heat and pressure using a Carver press under typical polycarbonate card lamination conditions. These conditions are: heating the stack under 166° C. (330° F.), and 758 kiloPascals (110 psi) for 15 minutes, followed by cooling to room temperature under 758 kiloPascals (110 psi). Sample polycarbonate cards in the dimension of 8.56 centimeters×5.40 centimeters (3.370 inches×2.125 inches) were punched out from the laminated stack.

The sample polycarbonate cards were laminated to a sample of Processing Tape similar to the one prepared in Synthesis Example SE1, except that the level of Crosslinker used was 0.2% by dry weight, and laser engraved with a portrait at 300 dots per inch (118 dots per centimeter) resolution by a MECCOMARK Fiber Laser Marking System equipped with a 20W fiber laser. The Processing Tape was then removed (acceptable levels of adhesive residue were present) and the resulting personalized portrait image was a good portrait image.

Example 4

A microlens film sheet was produced by micro-replication of an array of tightly packed lenses with Acrylate Resin onto a roll of 100 micrometers (4 mils) thick 3M Clear Polycarbonate Security Film (3M Company, St. Paul, Minn.). The resulting lens film was approximately 123 micrometers thick. The replicated lenses had a 37.0 micrometer radius of curvature and a negative 0.931 conic constant. The diameter of each lens formed at the surface of the acrylate was 86 micrometers, with a center-to-center lens distance of 74 micrometers. The microlens film sheet was then imaged with color floating/sinking images to form the imaged lens film "A", following the process as that described in US Patent Publication 2007/0081254.

Preparation of a Hydrophobic Coating Composition:

Step 1: Preparation of Surface Modified 98 nm Silica Nanoparticles:

In a flask equipped with a condenser and a thermometer, 300 grams of Silica Nanoparticles-2 and 300 grams of isopropyl alcohol were mixed together under rapid stirring. To this mixture was added 7.96 grams of STA-1 was added, and the mixture was stirred for 10 minutes. An additional 200 grams of isopropyl alcohol was added. The mixture was heated to 80° C. for 16 hours using a heating mantle. The resulting solution was allowed to cool down to room temperature. 1200 grams of methyl isobutyl ketone (MIBK) was added to the resulting solution. Most of the solvents were removed using a rotary evaporator in a 60° C. water-bath, resulting in 35.4% by weight surface modified 98 nm silica dispersion in MIBK.

Step 2: Preparation of the Coating Formulation:

The coating formulation was prepared by mixing the gradients listed below in Table 6 under rapid stirring to form a homogenous solution.

TABLE 6

| Material | Weight % solid | Amount (grams) |
| --- | --- | --- |
| Surface modified 98 nm silica dispersion in MIBK | 35.4 | 24.2 |
| UA-1 | 100 | 8.58 |
| HFPO-UA | 30% wt in MEK | 7.12 |
| 1-methoxy-2-propanol | NA | 113 |
| IPA | NA | 227 |
| Photoinitiator | 100 | 0.38 |
| Total | | 380.3 |

NA = Not Applicable

The resulting Coating Composition was applied on top of the imaged lens film "A" using a #5 Meyer Rod. The resulting film was then dried in air for 15 minutes and cured using a Fusion UV-Systems Inc. Light-Hammer 6 UV (Gaithersburg, Md.) processor equipped with an H-bulb, operating under nitrogen atmosphere at 75% lamp power at a line speed of 45 feet/minute (13.5 meters/minute) (2 passes). This gave the surface coated lens film "C".

The processing tape prepared in Synthesis Example SE1 was laminated to the coated microstructured surface of the microlens film sheet to form cover film "D".

The cover film "D" was sheeted to 15.2 centimeter×15.2 centimeter (6 inch×6 inch) square sheets and stacked with the color floating/sinking image side down to other sheets of the same size to form the seven layer stack shown in Table 7 below.

TABLE 7

| Layer | Description |
| --- | --- |
| 1 | Cover Layer "D" |
| 2 | 100 micrometer thick 3M Laser Engravable Polycarbonate Security Film (3M Company, St. Paul, MN) |
| 3 | 100 micrometer thick 3M White Polycarbonate Security Film (3M Company, St. Paul, MN) |
| 4 | 100 micrometer thick 3M White Polycarbonate Security Film (3M Company, St. Paul, MN) |
| 5 | 100 micrometer thick 3M White Polycarbonate Security Film (3M Company, St. Paul, MN) |
| 6 | 100 micrometer thick 3M Laser Engravable Polycarbonate Security Film (3M Company, St. Paul, MN) |
| 7 | 50 micrometer thick 3M Clear Polycarbonate Security Film (3M Company, St. Paul, MN) |

The stack of films described by Table 7 was laminated with heat and pressure using a Carver press under typical polycarbonate card lamination conditions. These conditions are: heating the stack under 166° C. (330° F.), and 758 kiloPascals (110 psi) for 15 minutes, followed by cooling to room temperature under 758 kiloPascals (110 psi). Sample polycarbonate cards in the dimension of 8.56 centimeters×5.40 centimeters (3.370 inches×2.125 inches) were punched out from the laminated stack.

The sample polycarbonate cards were laser engraved with a portrait at 300 dots per inch (118 dots per centimeter) resolution by a MECCOMARK Fiber Laser Marking System equipped with a 20W fiber laser. The processing tape was then removed by hand peel. The adhesive was peeled away cleanly leaving essentially no adhesive residue and the resulting personalized portrait image was a good portrait image.

Comparative Example C2

In Comparative Example C2, a tape was prepared by coating PSA-2 on a roll of 50 micrometers (2 mils) thick 3M Clear Polycarbonate Security Film (3M Company, St. Paul, Minn.) using a knife coater, followed by drying in a 120° C. oven for 15 minutes to give a dry thickness of approximately 0.9-1.1 mils (23-28 micrometers). The tape sample was used to prepare a laminate and Processing Tape Testing was carried out using the Test Method described above. The results are shown in Table 8.

TABLE 8

| Example | Card Quality | Tape Removal By Peel | 2 Dimensional Laser Image Formation |
| --- | --- | --- | --- |
| C2 | Pass | Somewhat tight Peel, almost clean removal | Poor, Air Bubbles present on a very light image |

What is claimed is:

1. A laser-personalizable security article comprising:
a multi-layer security document, the multi-layer security document comprising: an optically transparent cover layer with a first surface, a second surface, and a thickness between the first surface and the second surface, the first surface being at least partially a microstructured surface, having a refractive index between 1.45 and 1.55, wherein the microstructured surface forms microlenses or a lenticular surface;
a composite image, wherein the composite image comprises a collection of complete or partial images located on the second surface of the cover layer such that when viewed through the microstructured surface of the cover layer, the collection of complete or partial images forms the composite image;
and an imagable layer adjacent to the second surface of the cover layer, wherein the imagable layer comprises a laser imagable layer;
and an optically transparent, removable, conformable layer, wherein the removable, conformable layer comprises a processing tape wherein the tape comprises and optically transparent backing; and an optically transparent pressure sensitive adhesive layer at least partially coated on the backing, wherein the pressure sensitive adhesive sufficiently wets out on the microstructured surface to render the microstructured surface invisible to a writing laser and the optically transparent, removable, conformable layer has a refractive index in the range of 1.45-1.55.

2. The laser-personalizable security article of claim 1, wherein the microstructured surface comprises microlenses, and the cover layer thickness is such that the second surface of the cover layer is within the focal plane of the microlenses.

3. The laser-personalizable security article of claim 1, wherein the composite image comprises a color image.

4. The laser-personalizable security article of claim 1, wherein the cover layer comprises a multi-layer construction comprising a cover film and a spacing layer.

5. The laser-personalizable security article of claim 1, wherein the imagable layer comprises a laser charable layer, a laser writable multi-layer film article, or a combination thereof.

6. The laser-personalizable security article of claim 1, wherein the processing tape pressure sensitive adhesive has a refractive index that is within 0.05 of the refractive index of the microstructured surface.

7. The laser-personalizable security article of claim 1, wherein the microstructures surface comprises a coating layer, and wherein the coating layer comprises a cured reaction mixture comprising:
   i) a majority of at least one multifunctional (meth)acrylate monomer;
   ii) at least one perfluoropolyether additive having a perfluoropolyether moiety and at least one free radically reactive group;
   iii) surface treated nanoparticles; and
   iv) an initiator.

* * * * *